United States Patent
Sudo et al.

(10) Patent No.: US 8,774,959 B2
(45) Date of Patent: Jul. 8, 2014

(54) METHOD OF CALCULATING TEMPERATURE DISTRIBUTION OF CRUCIBLE

(75) Inventors: Toshiaki Sudo, Akita (JP); Eriko Suzuki, Akita (JP); Naoki Ono, Tokyo (JP)

(73) Assignees: Japan Super Quartz Corporation, Akita (JP); Shibaura Institute of Technology, Tokyo (JP)

( * ) Notice: Subject to any disclaimer, the term of this patent is extended or adjusted under 35 U.S.C. 154(b) by 594 days.

(21) Appl. No.: 13/147,736

(22) PCT Filed: Dec. 14, 2010

(86) PCT No.: PCT/JP2010/072505
§ 371 (c)(1),
(2), (4) Date: Aug. 3, 2011

(87) PCT Pub. No.: WO2011/074588
PCT Pub. Date: Jun. 23, 2011

(65) Prior Publication Data
US 2011/0295405 A1  Dec. 1, 2011

(30) Foreign Application Priority Data
Dec. 15, 2009 (JP) .................. 2009-283635

(51) Int. Cl.
G06F 19/00 (2011.01)
C03B 19/09 (2006.01)
G06F 17/50 (2006.01)
C30B 15/10 (2006.01)

(52) U.S. Cl.
CPC ........... *C03B 19/095* (2013.01); *G06F 2217/80* (2013.01); *G06F 17/5018* (2013.01); *C30B 15/10* (2013.01)
USPC .......................................... 700/211; 700/117

(58) Field of Classification Search
CPC .............. C03B 19/095; G06F 2217/80; G06F 17/5018; C30B 15/10
USPC .......................... 700/104, 117, 173, 207–211
See application file for complete search history.

(56) References Cited

U.S. PATENT DOCUMENTS

6,275,750 B1 * 8/2001 Uchida et al. ................. 700/300

FOREIGN PATENT DOCUMENTS

| JP | 01-225891 A | 9/1989 |
| JP | 03-252390 A | 11/1991 |
| JP | 2006-096578 A | 4/2006 |

OTHER PUBLICATIONS

International Search Report for PCT/JP2010/ 72505 (mailing date: Jan. 25, 2011).

*Primary Examiner* — Sean Shechtman
*Assistant Examiner* — Chad Rapp
(74) *Attorney, Agent, or Firm* — Law Office of Katsuhiro Arai

(57) ABSTRACT

Provided is a method of calculating a temperature distribution with higher accuracy than a conventional method, which calculates a temperature distribution of an inner surface of a silica powder molded body during manufacturing based on boundary conditions corrected in accordance with the actually measured temperature in consideration of plasma radiation by arc discharge and heat radiation of arc discharge.
According to a method of calculating a temperature distribution of a crucible during manufacturing, includes a temperature calculation process in which a temperature calculator calculates temperature distribution in an inner surface of a silica powder molded body through a numerical calculation method which mesh-divides an object to be calculated, by calculating heat flux from heat plasma modeled by a gas flow and radiation of heat plasma radiated from arc electrodes, wherein the temperature distribution is calculated by adjusting gas flow and radiation conditions in a way that the calculated temperature distribution and the actually measured temperature distribution of an inner surface of a silica powder molded body becomes similar, and reading, from a correspondence table, gas flow and radiation conditions corresponding each step of a control sequence for producing a crucible.

9 Claims, 19 Drawing Sheets

Analysis Model setting a region for analysis quartz mass density:
1.32e-6(kg/mm3)

heat conductivity:

| | |
|---|---|
| 0 | 390 |
| 400 | 400 |
| 600 | 410 |
| 800 | 450 |
| 1000 | 550 |
| 1200 | 740 |
| 1400 | 1000 |
| 1700 | 3000 |
| 2000 | 4500 |
| 3000 | 6500 |
| (°C) | (microW/mmC) | specific heat:
1e+09(microJ/kgK)

mold mass density:
1.7e-6(kg/mm3)

heat conductivity:
10000(microW/mmC)

specific heat:

| | |
|---|---|
| 0 | 651000000 |
| 47.62 | 837000000 |
| 95.24 | 949000000 |
| 142.86 | 1050000000 |
| 190.48 | 1150000000 |
| 238.1 | 1240000000 |
| 285.71 | 1330000000 |
| 333.33 | 1400000000 |
| 380.95 | 1470000000 |
| 428.57 | 1510000000 |
| 500 | 1580000000 |
| 738.1 | 1740000000 |
| 1000 | 1860000000 |
| 1500 | 2030000000 |
| 2000 | 2120000000 |
| 2500 | 2200000000 |
| (°C) | (microJ/kgK) | air mass density:
9.46e-10(kg/mm3)

heat conductivity:
24.1(microW/mm C)

thermal expansion coefficient
0.00341(1/C)

absolute viscosity

| | |
|---|---|
| -50 | 1.46e-8 |
| -25 | 1.59e-8 |
| 0 | 1.71e-8 |
| 25 | 1.82e-8 |
| 50 | 1.93e-8 |
| 75 | 2.05e-8 |
| 100 | 2.16e-8 |
| 50000 | 2.2e-8 |
| (°C) | (kg/mm sec) | isobaric specific heat
1.006e9(microJ/kgK)

gas constant
2.87e8(microJ/kgK)

Fig. 5

| size | Analysis A | Analysis B |
|---|---|---|
| radiation temperature | 6500K | 3200K |
| gas flow | 20m/s, 9000K | 19m/s, 30000K |
| radiation heat amount | 2300kW | 300kW |
| convection heat amount | 200kW | 1700kW |
| electrode diameter | 57mm | 97.5mm |

Fig. 11

METHOD OF CALCULATING TEMPERATURE DISTRIBUTION OF CRUCIBLE

This application is the U.S. National Phase under 35 U.S.C. §371 of International Application, PCT/JP2010/072505, filed Dec. 14, 2010, which claims priority to Japanese Patent Application No. JP 2009-283635, filed Dec. 15, 2009. The International Application is to be published under PCT Article 21(2) in a language other than English.

TECHNICAL FIELD

The present invention relates to a method of judging, by analysis, optimal manufacturing conditions for manufacturing a defect-free and high-quality crucible, in forming a vitreous silica crucible (hereinafter, "crucible") by fusing a silica powder molded body. In particular, the present invention relates to a method of calculating a temperature distribution of various portions in the crucible in a melting state, and evaluating, at various points, a change of the temperature distribution causing a melting state of the powder molded body.

BACKGROUND ART

A substrate for manufacturing a semiconductor device is mainly made of high-purity single crystal silicon. The Czochralski method (hereinafter referred to as " CZ method") is, in general, used for manufacturing the single crystal silicon. The CZ method is performed by filling blocks of raw material polycrystalline silicon into a crucible provided in a semiconductor single crystal manufacturing apparatus, and melting the raw material polycrystalline silicon by a heater provided around the crucible. Then, a seed crystal held by a seed chuck is dipped into the melt, and the seed crystal is pulled up while rotating the seed chuck and the vitreous silica crucible in the same direction or opposite direction, to grow high-purity single crystal silicon. For this reason, the crucible needs to be manufactured to have an uniform quality so as to include a certain amount of impurities in order to introduce a certain amount of impurities into the grown ingot.

Conventionally, a rotating mold method is known as a method of manufacturing the above-mentioned vitreous silica crucible. This method is performed by heating and vitrifying an inner surface of a silica powder molded body deposited on an inner surface of a rotating mold, from a mold cavity side by use of heat plasma generated by arc discharge.

Parameters such as a value of discharge current supplied to the arc electrodes (arc current) and the position of the arc electrodes (the height of the electrodes, the deviated position of the electrodes) in generating heat plasma for heating the crucible are currently adjusted based on experience and intuition.

Therefore, parameters used for actual manufacturing can be estimated by simulating a temperature distribution, of a silica powder molded body inner surface, enabling manufacturing a vitreous silica crucible with quality higher than the standard. A finite element method or finite difference method is currently known for the simulation of thermal fluid (See Patent Document 1).

PRIOR ART REFERENCE

Patent Document

Patent Document 1: JP-A-Hei 03-252390

SUMMARY OF THE INVENTION

Problems to be Solved by the Inventions

The above-mentioned Patent Document discloses calculation of a temperature distribution due to heat conduction in a solid or thermal fluid. However, it does not disclose a model to calculate a temperature distribution of a crucible inner surface while taking account of plasma emission generated by the arc discharge and heat radiation of the arc discharge itself in fusing a crucible.

Furthermore, it is not possible to measure a temperature distribution, of a silica powder molded body, which is varied by the heat amount supplied by the plasma emission in the arc discharge and the radiation heat of the arc discharge during manufacturing.

Thus, it is not possible to adjust boundary conditions of the arc discharge model through comparison of the calculated temperature distribution and the actually measured temperature distribution. Therefore, it is not possible to calculate an accurate temperature distribution in each of the steps of the control sequence.

Therefore, in manufacturing a crucible, it is not possible to accurately calculate the melting speed etc of silica on the inner surface of the silica powder molded body, which influence on the ratio of bubbles mixed in the crucible.

The present invention has been made in view of such circumstances, and the purpose is to provide a method of calculating, more accurately than before, a temperature distribution of a silica powder molded body inner surface during manufacturing, by taking account of plasma emission generated by arc discharge and heat radiation of the arc discharge itself and using boundary conditions corrected based on an actually measured temperature.

Means for Solving the Problems

A method of calculating a temperature distribution of a crucible during manufacturing, according to the invention, includes calculating a temperature distribution of a silica powder molded body using a finite element method, wherein the silica powder molded body is formed, in a certain thickness, on an inner surface of a mold for manufacturing a crucible;

heat plasma generated by supplying discharge current to arc electrodes is released to the silica powder molded body;

the position of the arc electrodes and the discharge current are changed according to a control sequence;

the temperature distribution is calculated for each of steps of the control sequence for manufacturing the crucible by melting and solidifying the silica powder molded body;

the heat plasma is modeled by heat convection due to a gas flow, and radiation;

an initial velocity, heat amount, and temperature of the gas flow, and a temperature and heat amount of the radiation are used as boundary conditions for the finite element method;

a temperature calculator calculates the temperature distribution by reading the boundary conditions corresponding to the position of the arc electrodes and the discharge current for each of the steps, from a correspondence table describing the boundary conditions of the gas flow and the radiation corresponding to the discharge current for each of the positions of the arc electrodes;

the correspondence table is prepared in advance by, for each combination of the position of the arc electrodes and the discharge current, comparing an actually measured temperature distribution of the silica powder molded body irradiated with plasma and a calculated temperature distribution obtained from the finite element method using the boundary conditions of the gas flow and the radiation, and adjusting the boundary conditions so that the actually measured and calculated temperature distributions coincide.

In the method of calculating a temperature distribution of a crucible during manufacturing, according to the invention, the actually measured temperature distribution is about temperatures on a silica powder molded body inner surface.

In the method of calculating a temperature distribution of a crucible during manufacturing, according to the invention, a mesh division process in which a mesh divider divides, into a plurality of finite elements, the silica powder molded body, the silica powder molded body inner space, the mold and the mold outer space;

a heat convection condition reading process in which a heat convection calculator reads, from the correspondence table according to the position of the arc electrodes and the discharge current, gas flow conditions comprising a temperature, flow rate, and heat amount of the gas flow released from a source which is a model of a heat plasma flow released from the arc electrodes, and reads physical properties of a medium of heat convection in the silica powder molded body inner space, from a memory storing physical properties of a medium in connection with the medium; a heat convection calculation process in which the heat convection calculator calculates heat flux supplied from the heat convection to the surface of the silica powder molded body, using, as boundary conditions, the gas flow conditions, the physical properties of the medium, and the temperature of the silica powder molded body inner surface;

a radiation condition reading process in which a radiation heat amount calculator reads, from the correspondence table according to the position of the arc electrodes and the discharge current, radiation conditions comprising a temperature and heat amount radiated from a heat source which is a model of radiation from the arc electrodes to the silica powder molded body;

a radiation heat amount calculation process in which the radiation heat amount calculator calculates heat flux supplied to the surface of the silica powder molded body, using, as boundary conditions, the radiation conditions and the temperature of the silica powder molded body inner surface;

a temperature distribution calculation process in which the temperature distribution calculator calculates the temperature distribution of the silica powder molded body by performing heat transfer analysis between the silica powder molded body inner space and the silica powder molded body and heat conduction analysis within the silica powder molded body, using the heat flux from the heat convection and the radiation as boundary conditions.

The method of calculating a temperature distribution of a crucible during manufacturing, according to the invention, further includes, in the temperature distribution calculation process, reading, from a memory storing physical properties of silica powder in connection with temperature of silica powder which is a material of the silica powder molded body, the physical properties in connection with the temperature of the silica powder molded body, and calculating the heat flux from the heat convection to the silica powder molded body inner surface, for taking account of a state change from powder to melting of the silica powder molded body.

The method of calculating a temperature distribution of a crucible during manufacturing, according to the invention, further includes, in the temperature distribution calculation process, changing, on a mesh basis, physical properties of the silica powder molded body in connection with the temperature distribution, and calculating the temperature distribution from a powder state to a melting state of the silica using the original meshes.

In the method of calculating a temperature distribution of a crucible during manufacturing, according to the invention, the gas flow conditions and the radiation conditions, used as boundary conditions, in the correspondence table are corrected based on the result of comparison between a temperature distribution actually measured on the crucible inner surface in a manufacturing process, and a temperature calculated on the silica powder molded body surface in the temperature distribution calculation process, provided that the position of the arc electrodes and the discharge current are identical.

In the method of calculating a temperature distribution of a crucible during manufacturing, according to the invention, a heat amount due to the convection of the gas flow is larger than a heat amount due to the radiation from the arc electrodes.

An apparatus of calculating a temperature distribution of a crucible during manufacturing, according to the invention, includes a temperature calculator for calculating a temperature distribution of a silica powder molded body using a numerical calculation method in which a calculation object is divided into meshes, and mesh-by-mesh numerical calculation is performed, and numerical calculation of the calculation object as a whole is performed based on the result of the mesh-by-mesh numerical calculation, wherein the silica powder molded body is formed, in a certain thickness, on an inner surface of a mold for manufacturing a crucible;

heat plasma generated by supplying discharge current to arc electrodes is released to the silica powder molded body;

the position of the arc electrodes and the discharge current are changed according to a control sequence;

the temperature distribution is calculated for each of steps of the control sequence for manufacturing the crucible by melting and solidifying the silica powder molded body;

the heat plasma is modeled by heat convection due to a gas flow, and radiation;

an initial velocity, heat amount, and temperature of the gas flow, and a temperature and heat amount of the radiation are used as boundary conditions for the numerical calculation method;

the temperature calculator calculates the temperature distribution by reading the boundary conditions corresponding to the position of the arc electrodes and the discharge current for each of the steps, from a correspondence table describing the boundary conditions of the gas flow and the radiation corresponding to the discharge current for each of the positions of the arc electrodes;

the correspondence table is prepared in advance by, for each combination of the position of the arc electrodes and the discharge current, comparing an actually measured temperature distribution of the silica powder molded body irradiated with plasma and a calculated temperature distribution obtained from the numerical calculation method using the boundary conditions of the gas flow and the radiation, and adjusting the boundary conditions so that the actually measured and calculated temperature distributions coincide.

In the method of calculating a temperature distribution of a crucible during manufacturing, according to the invention, the temperature calculator comprises a mesh divider, a heat convection calculator, a radiation heat amount calculator, a temperature distribution calculator, The mesh divider performs a mesh division process in which a mesh divider divides, into a plurality of finite elements, the silica powder molded body, the silica powder molded body inner space, the mold and the mold outer space;

the heat convection calculator performs a heat convection condition reading process in which a heat convection calculator reads, from the correspondence table according to the position of the arc electrodes and the discharge current, gas flow conditions comprising a temperature, flow rate, and heat amount of the gas flow released from a source which is a model of a heat plasma flow released from the arc electrodes, and reads physical properties of a medium of heat convection in the silica powder molded body inner space, from a memory storing physical properties of a medium in connection with the medium;

the heat convection calculator performs a heat convection calculation process in which the heat convection calculator calculates heat flux supplied from the heat convection to the surface of the silica powder molded body, using, as boundary conditions, the gas flow conditions, the physical properties of the medium, and the temperature of the silica powder molded body inner surface;

the radiation heat amount calculator performs a radiation condition reading process in which a radiation heat amount calculator reads, from the correspondence table according to the position of the arc electrodes and the discharge current, radiation conditions comprising a temperature and heat amount radiated from a heat source which is a model of radiation from the arc electrodes to the silica powder molded body;

the radiation heat amount calculator performs a radiation heat amount calculation process in which the radiation heat amount calculator calculates heat flux supplied to the surface of the silica powder molded body, using, as boundary conditions, the radiation conditions and the temperature of the silica powder molded body inner surface;

the temperature distribution calculator performs a temperature distribution calculation process in which a temperature distribution calculator calculates the temperature distribution of the silica powder molded body by performing heat transfer analysis between the silica powder molded body inner space and the silica powder molded body and heat conduction analysis within the silica powder molded body, using the heat flux from the heat convection and the radiation as boundary conditions.

Effect of the Invention

According to this invention, because plasma heating due to the arc discharge used in manufacturing a crucible is attributed to a heat plasma flow released from arc electrodes and radiation heat radiated from the arc electrodes, the plasma heating is modeled by using, for the heat plasma, heat convection of a gas flow and using, for the radiation heat, radiation of heat amount radiated from a heat source. Therefore, the temperature distribution is calculated under an environment which is close to actual plasma heating, and thus temperature distribution with high accuracy can be calculated.

In other words, according to the invention, heat transfer to a silica powder molded body inner surface can be calculated using, as boundary conditions, heat flux to the silica powder molded body inner surface from each of the heat plasma flow from the arc electrodes which is a model of arc discharge and the radiation from the arc discharge in the arc electrodes in connection with discharge current supplied to the arc electrodes. Thus, the surface temperature distribution of the silica powder molded body inner surface can be calculated accurately. Thus, the melting speed of silica powder can be detected. Thus, it is possible to obtain a guide for temperature adjustment to adjust the amount of bubble content in manufacturing a crucible through control of discharge current in the arc electrodes and the position of the electrodes.

Furthermore, according to the present invention, a calculated temperature distribution of the silica powder molded body surface is compared with a temperature distribution, of the silica powder molded body inner surface, obtained in conditions corresponding to the position of the arc electrodes and the discharge current used in the calculation, so that corresponding positions in the temperature distributions are compared. Then, the gas flow and radiation conditions used for the calculation are changed through the comparison, to adjust the conditions to match the calculated values with actually measured values. Thus, the accuracy of the temperature distribution is improved. Therefore, in adjusting conditions when the position of the arc electrodes are changed etc., it is possible to perform calculation to obtain a surface temperature distribution which is similar to that in actual manufacturing. Thus, it is possible to omit waste such as experimentally manufacturing a crucible, and it is possible to obtain a guide for temperature adjustment in designing a control sequence.

BRIEF DESCRIPTION OF THE DRAWINGS

FIG. 5 is a conceptual diagram showing tables of physical properties for silica powder, carbon which is a material for a mold, and the air. The tables are used for the finite element method.

FIG. 11 is a table showing two kinds of boundary conditions for Analysis A and Analysis B which are models of heat convection and radiation of heat plasma.

DESCRIPTION OF THE PREFERRED EMBODIMENTS

1. Explanation of Model and Principle of Simulation

Figure 1:
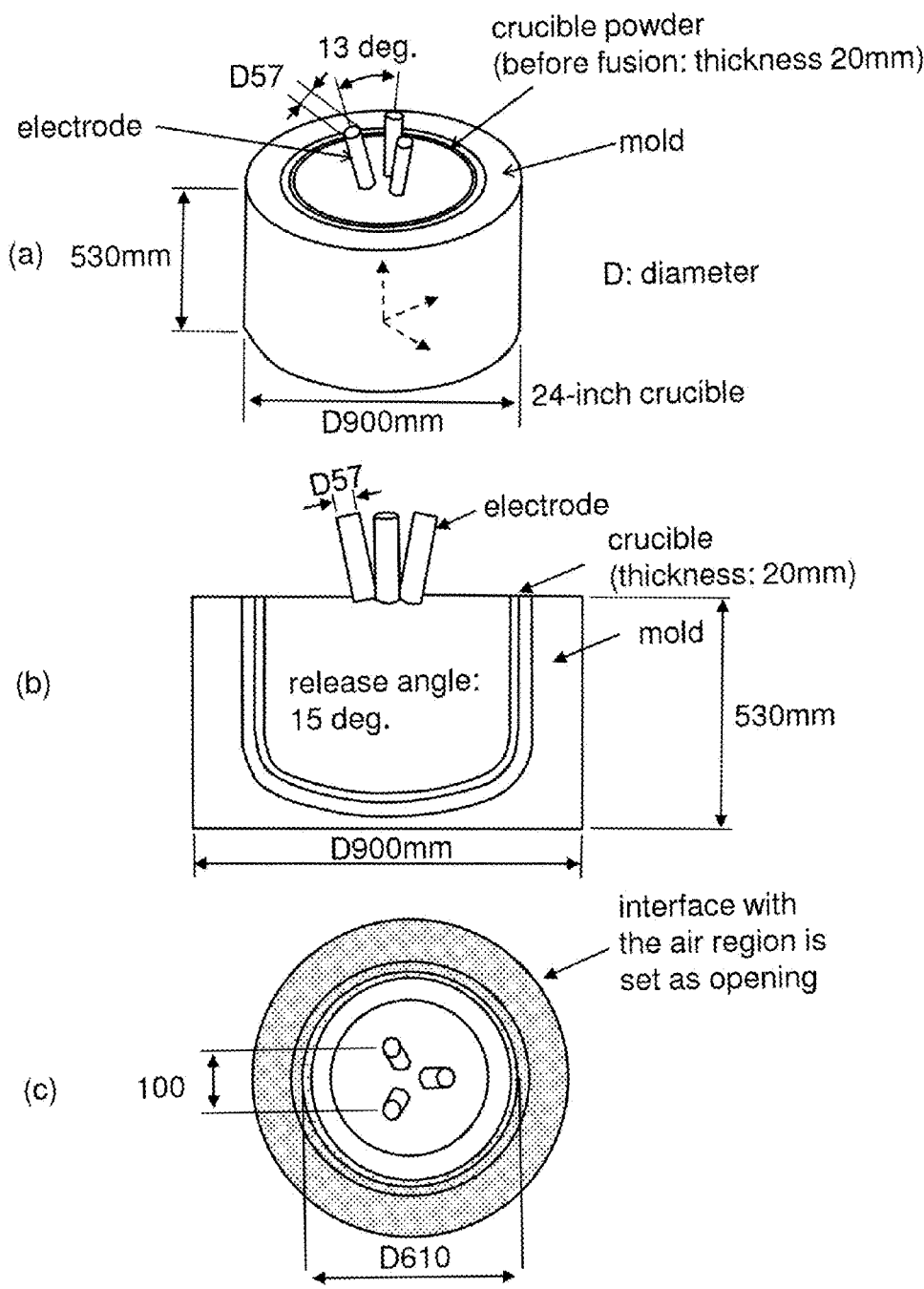
FIG. 1 is a conceptual diagram showing a model of a mold and a silica powder molded body which are an analysis object for performing a temperature distribution calculation of a crucible during manufacturing, according to an embodiment of the present invention.

The present invention calculates a temperature distribution of a crucible during manufacturing using a finite element method. For this purpose, a simulation model for analysis is defined as shown in FIG. 1. The model includes a mold, a silica powder molded body formed in the mold, an inner space of the silica powder molded body, and arc electrodes as a heat source for supplying heat for fusing the silica powder molded body. The mold is made of carbon, and has a cavity for forming a crucible. The silica powder molded body is formed of a silica powder, and is obtained by depositing the silica powder inside the cavity on the inner surface of the mold in a predetermined thickness for a crucible, and pressing the resultant silica power layer using a paddle.

Figure 2:
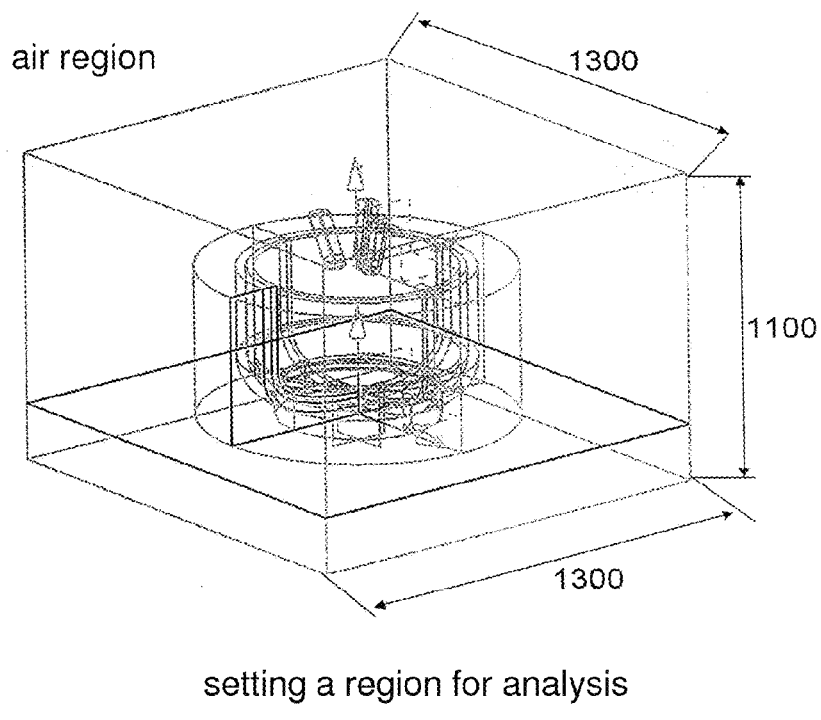
FIG. 2 is a conceptual diagram showing an analytical space, for calculation of a temperature distribution, which includes the analysis object in FIG. 1.

FIG. 2 illustrates analytical space for analysis of a temperature distribution. This space includes the above-mentioned simulation model. In the present embodiment, a size of a crucible to be manufactured is assumed to be 24 inches, for example. In this case, the diameter and height of a mold for forming the silica powder molded body inside of the mold are set to be 900 mm and 530 mm, respectively, and the rectangular parallelepiped-shaped analytical space is set to have a longitudinal dimension of 1300 mm and a lateral dimension of 1100 mm in view of the range of outflow boundary.

As previously explained, the crucible is manufactured by arc fusing the silica powder molded body on the mold by use of heat supplied by the arc discharge generated by supplying discharge current to the arc electrodes (carbon electrodes).

It has been observed that gas flow of heat plasma is released toward the crucible bottom direction from these arc electrodes when the arc discharge is generated by the supply of the discharge current to the arc electrodes. Therefore, heat is supplied to the silica powder molded body not only through radiation heat due to heat radiation by the arc discharge, but also heat transfer due to heat convection of the gas flow of the heat plasma in the crucible.

Therefore, in the present embodiment, the time-course temperature distribution (for each mesh) of the overall silica powder molded body is calculated through simulation using a finite element method. In this calculation, both radiation from the arc electrodes and convective heat transfer due to het convection of the heat plasma from the arc electrodes are taken into consideration for the heat environment.

Here, the radiation diameter of the heat plasma becomes larger as the distance from the arc electrodes increases. Therefore, as a heat transfer model of the heat plasma, a gas flow approximating the shape of the plasma flow of the heat plasma is used as the heat transfer model.

For example, the heat transfer model of the present embodiment has a configuration that 3-phase alternating current is supplied to three arc electrodes as discharge current, and arc discharge is generated between the electrodes, and the gas plasma is released independently from each of the arc electrodes. Here, for the heat transfer model of the plasma flow, a gas flow rate (flow rate of a gas flow), a gas temperature (temperature of a gas flow), and a heat amount through convection of a gas flow (gas flow heat amount) are set as gas flow conditions for the gas flow from each of the arc electrodes.

In the present embodiment, the air is used as a fluid medium for transferring heat through convection, and thus the air is a medium for heat convection in the silica powder molded body inner space. Thus, physical properties of the air are stored in the physical property memory 7 for the calculation through the finite element method. The physical properties of the air are those as a fluid, and include density, thermal conductivity, thermal expansion coefficient, viscosity coefficient, isobaric specific heat and gas constant etc.

For the radiation from the arc electrodes, the arc discharge is generated from the bottoms of the arc electrodes, and thus the bottoms of the arc electrodes are used as a heat source "having a area of a radiation surface" (to be explained) for the heat transfer model. Here, radiation conditions including a radiation temperature and radiation heat amount are set for the radiation from the arc electrodes.

Here, initial values for gas flow conditions and radiation conditions corresponding to discharge current and discharge voltage of the arc discharge are calculated from the formulas below.

First, the initial value of the convection temperature of the gas flow in the plasma flow from the arc electrodes is calculated from the formula below.

$$Ec = [n \times (d/2)^2 \pi \times 10^{-3}] \times v \times 28.8 \times 1 \times Tc/22.4$$

In this formula, Ec (W: watt) is a convection heat amount of the gas flow of the plasma flow from the arc electrodes, d (m) is a diameter of the arc electrode, n is the number of the arc electrodes, v (m/sec) is a flow rate of the gas flow, 1 (J/gK) is a specific heat (isobaric specific heat) of the air, Tc is a gas temperature, 28.8 (g/mol) is a molecular weight of the air. Here, gas mass (mass of the gas) m per second is $[n \times (d/2)^2 \pi \times v \times 10^3 \times 28.8/22.4]$, and the initial value of a heat amount due to the convection of the gas flow is obtained through multiplying the gas mass per second by 1 (the specific amount of the air) and Tc (the gas temperature).

Next, the initial value for radiation conditions for the radiation from the arc electrodes is calculated from the formula below.

$$Er = n \times [\pi dh + (d/2)^2 \pi] \times 5.67 \times 10^{-8} \times Tr^4$$

In this formula, Er (W: watt) is a radiation heat amount of the arc electrodes, d (m) is a diameter of the arc electrode, n is the number of the arc electrodes, Tr (K, Kelvin) is a radiation temperature of the arc electrodes. Here, $[\pi dh + (d/2)^2 \pi]$ is a radiation area S (m²) of the electrodes, the formula of the black-body radiation ($E = S\sigma Tr^4$) for calculating radiant energy is used. $\sigma$ is the Stefan-Boltzmann constant, $5.67 \times 10^{-8}$ (Wm$^{-2}$K$^{-4}$).

Here, in the present embodiment, the voltage and the current supplied in manufacturing a crucible are 380 V (volt) and 3000 A (ampere), respectively, and thus the supplied power is "3000×380×3$^{1/2}$." Therefore, Ec+Er=2000 kW is assumed as described later.

Here, the sum of Ec and Er corresponds to the value in watt obtained from the multiplication of the discharge current and discharge voltage. In the present embodiment, Ec:Er=4:1 is assumed. In the present embodiment, the initial values of the gas flow conditions and radiation conditions are adjusted by adjusting the discharge current while keeping the discharge voltage to a constant value, for adjustment of the gas flow conditions and radiation conditions in the actual control.

Moreover, a correspondence table or relational expression is generated by actually measuring the temperature of the silica powder molded body inner surface irradiated with heat plasma, comparing the actually measured temperature distribution with a calculated temperature distribution, and correcting the gas flow conditions and radiation conditions.

Furthermore, in the present embodiment, the accuracy of simulation is judged by periodically measuring, using a radiation thermometer, the temperature distribution of the silica powder molded body inner surface including the fused state with a predetermined interval, and comparing the actually measured time-course temperature distribution with a time-course temperature distribution resulted from the calculation by the above-mentioned temperature distribution calculator. The above-mentioned gas flow conditions and radiation conditions are reset based on the time-course temperature difference on each point of the comparison results. Here, temperature measurement positions on the silica powder molded body inner surface are predetermined, and the corresponding coordinate positions on the simulated silica powder molded body (i.e. the meshes located on the inner surface of the silica powder molded body and on the corresponding coordinate positions) are selected to obtain the temperature, and the temperatures of the coordinate positions are compared with the actually measured temperatures.

Here, the temperature distribution calculator 4 resets (renews) the above-mentioned gas flow conditions and radiation conditions in the correspondence table or relational expression when it compares an actually measured temperature at any measurement position on the silica powder molded body inner surface and a calculated temperature at a corresponding position on the silica powder molded body inner surface and detects if the ratio of the temperature ((difference between the actually measured temperature and the calculated temperature)/the actual temperature, e.g. 2%) is above a predetermined threshold over a predetermined judgment period (e.g. 0.5 second).

The temperature distribution calculator 4 performs this process. That is, the temperature distribution calculator 4 increases or decreases values of the gas flow conditions and radiation conditions by a predetermined reference value, depending on whether the difference of the actually measured temperature distribution and the calculated temperature distribution is positive or negative on the sidewall of the silica powder molded body inner surface, or positive or negative on the bottom, which is remote from the arc electrodes. This process is repeated until the ratio of the temperature difference and the actual temperature difference becomes below a predetermined threshold, i.e. the actually measured temperature distribution and the calculated temperature distribution becomes identical or similar to each other. Then, the temperature distribution calculator 4 resets the correspondence table or relational expression stored in the model memory 6.

For example, when the temperature distribution calculator 4 finds that the temperature is low on the sidewall of the silica powder molded body inner surface and high on the bottom of the silica powder molded body inner surface, the temperature distribution calculator 4 decreases all values or the convection heat amount of the gas flow conditions by a predetermined value, and increases the radiation heat amount of the radiation conditions by a predetermined value.

Moreover, when the temperature distribution calculator 4 finds that the temperature is high on the sidewall of the silica powder molded body inner surface and low on the bottom of the silica powder molded body inner surface, the temperature distribution calculator 4 increases all values or the convection heat amount of the gas flow conditions by a predetermined value, and decreases the radiation heat amount of the radiation conditions by a predetermined value.

Moreover, when the temperature distribution calculator 4 finds that the temperature is low on the sidewall of the silica powder molded body inner surface and low on the bottom of the silica powder molded body inner surface, the temperature distribution calculator 4 increases all values or the convection heat amount of the gas flow conditions by a predetermined value, and increases the radiation heat amount by a predetermined value. Moreover, when the temperature distribution calculator 4 finds that the temperature is high on the sidewall of the silica powder molded body inner surface and high on the bottom of the silica powder molded body inner surface, the temperature distribution calculator 4 decreases all values or the convection heat amount of the gas flow conditions by a predetermined value, and decreases the radiation heat amount by a predetermined value.

Figure 22:
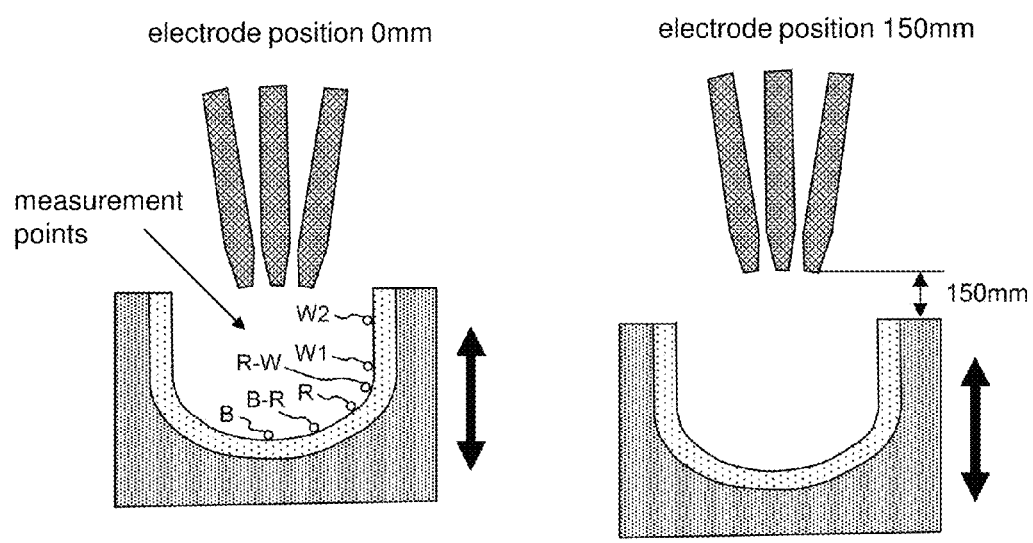
FIG. 22 is a conceptual diagram showing the position change of the arc electrodes in a crucible manufacturing process.

In practice, because there are multiple measurement points as shown in FIG. 22, the comparison is conducted not only for the combination of the above-mentioned two points (bottom and sidewall), but also for the combination of the actually measured value and the calculated value at all of the measurement points. Therefore, precise fitting of values for the gas conditions and radiation conditions (the gas flow rate, convection heat amount, and gas temperature for the gas conditions, and the radiation heat amount, radiation temperature for the radiation conditions) is possible. Therefore, the correspondence table or relational expression can be adjusted so as to obtain calculated values closer to the actually measured values.

Furthermore, in the present embodiment, a level at the opening of the silica powder molded body is defined as a vertical direction reference position, and a center of the opening (a center of the arc electrodes) is defined as a horizontal direction reference position. Then, the arc electrodes are displaced to the vertical and horizontal directions to define multiple positions. The gas flow conditions and radiation conditions are not changed. For each of the multiple positions of the arc electrodes, the temperature distribution is calculated and the obtained calculated temperatures are compared with actually measured temperatures at multiple measurement points for each of the positions of the arc electrodes. Then, the gas flow conditions and radiation conditions are adjusted as described above.

By the process above, an empirical formula, or correspondence table or relational expression is formed as boundary conditions to calculate a change in temperature distribution by the actual arc discharge. The empirical formula is for "the discharge current and discharge voltage" and "the gas flow conditions and radiation conditions" for each of the positions of the arc electrodes. The correspondence table or relational expression shows that the relationship between "the discharge current and discharge voltage" and "the gas flow conditions and radiation conditions" for each of the positions of the arc electrodes. The correspondence table or relational expression is a table or formula indicating the relationship between "the discharge current and discharge voltage supplied to the arc electrodes" and "the gas flow conditions and radiation conditions" with respect to the combination of the height of the arc electrodes and the deviation, of the arc electrodes, from the center position.

The obtained relational expression (or correspondence table) for "the discharge current and discharge voltage" and "the gas flow conditions and radiation conditions" enables the temperature distribution of the silica powder molded body to be calculated for any discharge current and discharge voltage and for varied height and deviation of the arc electrodes.

The correspondence table or relational expression includes, for example, the gas flow conditions and radiation conditions with respect to the combination of the discharge current and the deviations from the vertical direction reference position and horizontal direction reference position while the discharge voltage is kept constant.

Furthermore, the relational expression is set for respective gas flow conditions and radiation conditions, and is an empirical formula having parameters of the discharge current value and deviations from the vertical direction reference position and horizontal direction reference position while the discharge voltage is kept constant. Through fitting of the coefficients in the parameters, the gas flow temperature in the gas flow conditions and the radiation temperature in the radiation conditions are obtained.

The radiation heat amount and convection heat amount of the gas flow can be obtained by applying the relationship of the radiation heat amount (Er):the convection heat amount of the gas flow (Ec)=1:4 to the watt value obtained from the discharge voltage and discharge current.

Thus, according to the present embodiment, the control sequence can be formed through calculation of the temperature distribution of the silica powder molded body for the cases where the discharge current and deviations from the vertical direction reference position and horizontal direction reference position are changed. Thus, the control sequence, to actually manufacture a crucible from the silica powder molded body, can be formed without conducting many experiments.

Thus, the basic data to accurately control the temperature distribution change due to the heat convection of heat plasma and heat radiation from the arc discharge in manufacturing a crucible can be obtained through calculation without conducting actual experiments.

Furthermore, in the present embodiment, in accordance with the above-mentioned result, the change in the temperature distribution of the silica powder molded body is calculated for cases where the deviations from the vertical direction reference position and horizontal direction reference position are changed. Therefore, the change in the temperature distribution corresponding to the control sequence in manufacturing a crucible can also be calculated.

Figure 3:
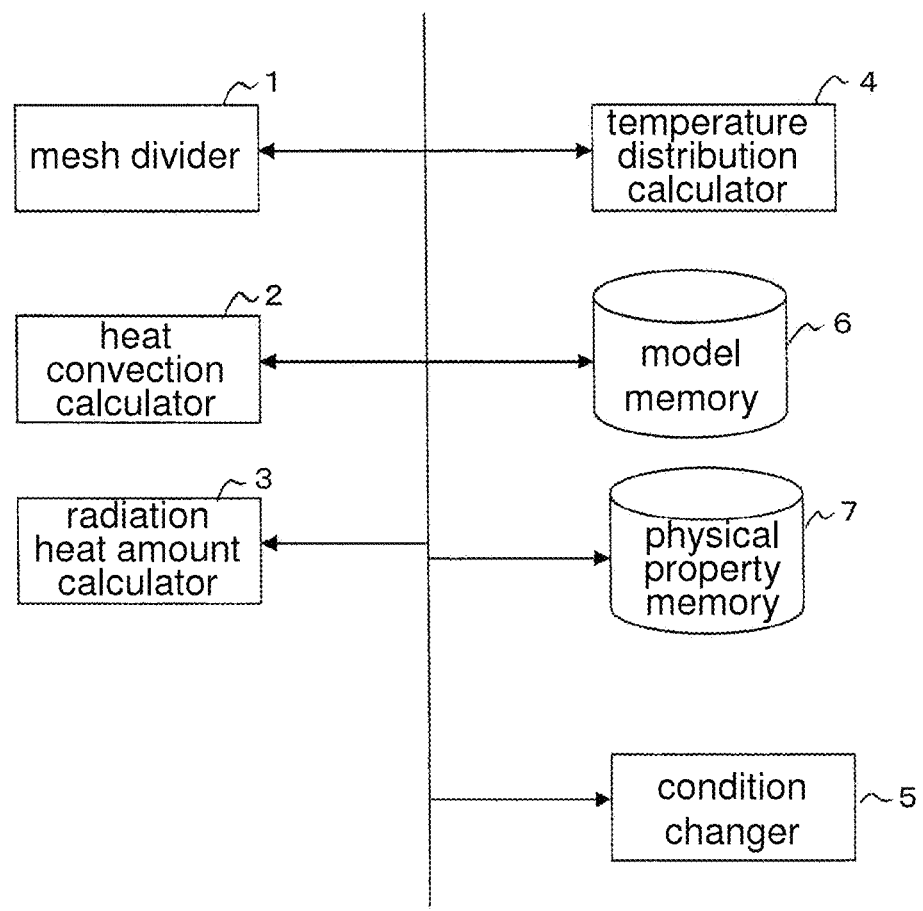
FIG. 3 is a block diagram showing a configuration example of an apparatus for calculating a temperature distribution which performs temperature distribution calculation of a crucible during manufacturing.

2. Explanation of Apparatus for Calculating Temperature Distribution of Crucible Hereinafter, embodiments of the present invention are explained with reference to drawings. FIG. 3 is a schematic block diagram showing an example of a configuration of an apparatus for calculating a temperature distribution of a crucible in manufacturing a crucible according to an embodiment of the present invention.

As shown in FIG. 3, the apparatus for calculating a temperature distribution according to the embodiment includes a mesh divider 1, a heat convection calculator 2, a radiation heat amount calculator 3, a temperature distribution calculator 4, a condition changer 5, a model memory 6 and a physical property memory 7. Hereinafter, each component will be explained.

2-1. Mesh Divider 1

Figure 4:
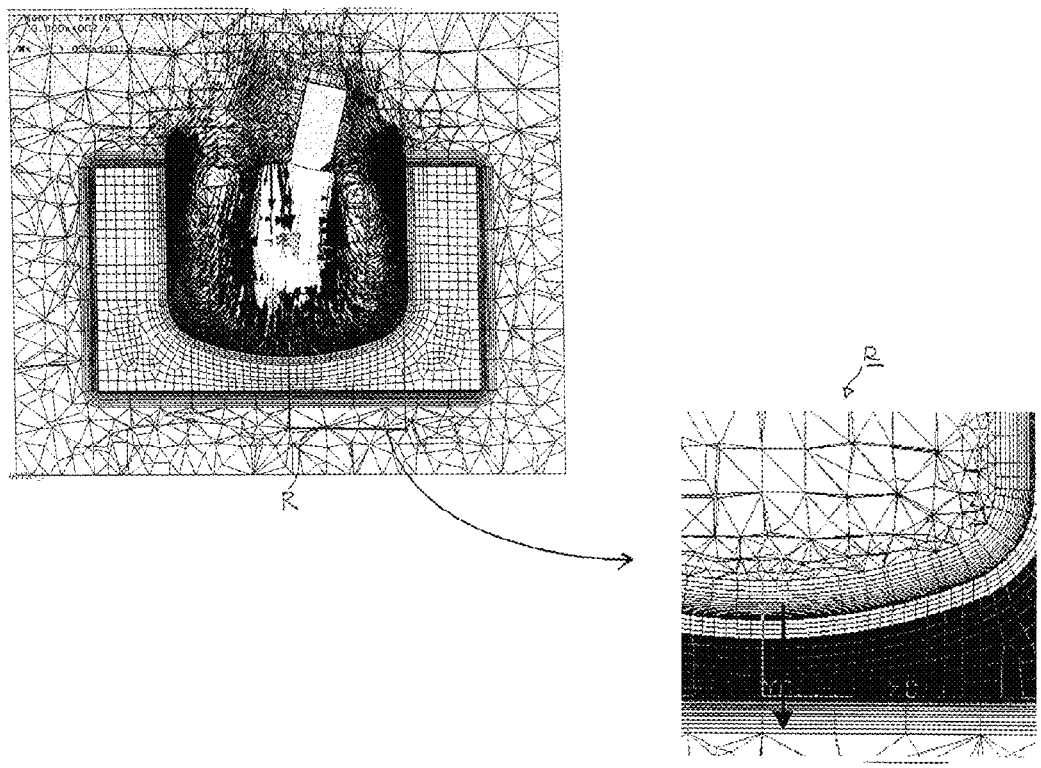
FIG. 4 is a conceptual diagram for explaining an example of mesh division of the analysis space in FIG. 2

The mesh divider 1, in accordance with mesh conditions inputted by a user, divides each analysis object in the analytical space shown in FIG. 2 into meshes (finite elements) as shown in FIG. 4 for calculation using a finite element method, and then writes and stores the mesh data in the model memory 6. In FIG. 2, the outer periphery of the cube is set as an open boundary condition.

Here, the inner space (in which heat convection due to the gas flow occurs) of the silica powder molded body is divided into three-layer layer meshes (fluid layer meshes) in a direction vertical to the inner surface of the silica powder molded body. These layers are different in the thickness of the mesh layer. The thickness of the layer mesh decreases as the distance to the inner surface of the crucible decreases.

The reason for this is as follows. In the initial condition, the temperature of the silica powder molded body is room temperature. In contrast, the gas flow temperature is 2800 deg. C. which is much higher than the room temperature. In view of this large temperature change, it is necessary to make the temperature distribution in a region having a large temperature change similar to a log function. In addition, in order to increase the accuracy of the heat flux calculation as the distance to the silica powder molded body inside decreases, it is necessary to decreases the size of the meshes.

That is, in the present embodiment, the size of the meshes gradually decreases from the outer surface, contacting the mold, of silica powder molded body to the inner surface because the convection heat amount is dominant. Similarly, the size of the meshes in the inner space gradually decreases from the center of the silica powder molded body inner space to the inner surface of the silica powder molded body in order to accurately calculate, at very high temperature, the heat flux q from the heat convection to the inner surface of the silica powder molded body, and the heat flux P due to the heat radiation from the arc electrodes. That is, because heat exchange occurs at very high temperature between the inner surface of the silica powder molded body and the inner space surface contacting the inner surface of the silica powder molded body, the size of the meshes is the smallest on the contacting region.

Furthermore, the reason that the silica powder molded body inner space is divided into analysis objects of multiple layers is to make the temperature distribution function $T=f(s)$ between the heat convection inner space and the inner surface of the silica powder molded body similar to a log function. For this reason, the thickness of the meshes in the multiple layers decreases as the distance to the inner surface of the silica powder molded body decreases.

That is, the number of the layer-mesh layers and the thickness of each of the layer-mesh layers are determined so as to accurately approximate a log function for the temperature difference between room temperature and 2800 deg. C. Here, "s" indicates the distance to the inner surface of the crucible.

When a portion near the inner surface of the silica powder molded body is fused, the temperatures of the inner surface and the outer surface of the silica powder molded body are 2000 deg. C. and 500 deg. C., respectively. In view of the thickness of the silica powder molded body, i.e. 20 mm (the thickness of the sidewall and the bottom), the temperature gradient (1500 deg. C. within 20 mm width) is very large. In view of this large temperature gradient, the silica powder molded body needs to have the number of meshes enough to secure the accuracy of the temperature measurement for calculation of temperature distribution in a thickness direction and along the inner surface of the crucible 2-2. Heat Convection Calculator 2

The heat convection calculator 2 reads analysis data (obtained by dividing the analytical space into meshes) shown in FIG. 4 from the model memory 6, and writes the data into a processing memory for processing (not shown), and reads gas flow conditions stored in the model memory 6. Based on the gas flow rate, gas temperature, convection heat amount of the obtained gas flow conditions, the heat convection calculator 2 calculates heat convection in the silica powder molded body inner space shown in FIG. 4 using the finite element method. In this case, the heat convection calculator 2 uses the air as a medium for heat transfer, and reads physical properties of the air from the physical property memory 7. The physical properties include mass density, thermal conductivity, thermal expansion coefficient, absolute viscosity, low pressure specific heat and gas constant.

Furthermore, the heat convection calculator 2 calculates the distribution of the velocity vector of the gas flow in the silica powder molded body inner space, for example, using the above physical properties and using the equation of continuity derived from the incompressible Navier-Stokes equation and the mass conservation law. That is, the heat convection calculator 2 calculates the spatial distribution of the velocity vector of the heat convection of the fluid (gas in the present embodiment) mediating heat amount.

Navier-Stokes Equation $$(\partial u/\partial t)+(u\cdot\nabla)u=-(1/\rho)p+v^2 u+f$$

The equation of continuity derived from the mass conservation law $$(\partial \rho/\partial t)+\nabla\cdot(\rho u)=0$$

In the above formulas, u is a velocity vector, $\rho$ is a fluid density, v is a viscosity coefficient, f is an external force vector applied to the fluid per unit volume. Numerical simulation is performed by solving the simultaneous equation of these two formulas, to obtain the velocity vector.

Here, the heat convection calculator 2 calculates the temperature distribution for each layer of the layer meshes using the energy equation, according to the above-mentioned velocity vector. Then, the heat convection calculator 2 calculates heat-transfer coefficients for the interface of the fluid and the inner surface of the silica powder molded body, and for each of the interfaces within the above-mentioned three layers, to form the temperature distribution function, T=f(s). Then, the heat convection calculator 2 calculates heat flux q for the inner surface of the silica powder molded body in accordance with the formula (1) for heat transfer.

$$(\partial T/\partial t)+(u\cdot\nabla)T=\lambda^2 T/\rho Cp \tag{1}$$

Here, temperature T (K, absolute temperature) : heat flux, $\lambda$ (W/m·K): thermal conductivity of the fluid, T (K): isobaric specific heat Cp (cal/g·K), s (m): a distance from the crucible inner surface 2-3. Radiation Heat Amount Calculator 3

The radiation heat amount calculator 3 sets a pair of a radiation surface and irradiated surface according to the distance from the radiation surface of the heat radiation source (heat transfer model of the arc discharge, that is, radiation model) to the inner surface of the silica powder molded body. Then, the radiation heat amount calculator 3 calculates the area ds of the radiation surface and the area dS of the irradiated surface from the distance between each pair of the radiation surface and the irradiated surface, and from the angle of the opposing surfaces. Then, the heat flux P transferred to the area dS through the area ds is calculated using a finite element method and based on the energy obtained using the common formula (2) for heat radiation.

$$P=\sigma\cdot ds(T_s^4-Ts^4)/((1/\epsilon_2)+(ds/dS)\alpha) \tag{2}$$

$$\alpha=(1/\epsilon_1)-1$$

Here, $\sigma$ is the Stefan-Boltzmann constant, $T_s$ is a temperature of arc which is a radiation source, Ts is a temperature of the silica powder molded body, $\epsilon_1$ is emissivity of the silica powder molded body, $\epsilon_2$ is emissivity of radiation source.

In the calculation of the heat flux, the emissivities $\epsilon_1$ and $\epsilon_2$ change along with the temperature. Therefore, emissivities corresponding to the temperature can be read and used. Furthermore, because the emissivities for silica powder and molten silica are different. Therefore, the heat flux due to radiation can be calculated while changing the emissivities $\epsilon_1$ and $\epsilon_2$ at the timing when the temperature exceeds the melting temperature.

2-4. Temperature Distribution Calculator 4

The temperature distribution calculator 4 calculates the temperature of the inside from the inner surface of the silica powder molded body to the outer surface using, as boundary conditions, the heat flux which is the sum of the heat flux q calculated by the heat convection calculator 2 and the heat flux P calculated by the radiation heat amount calculator 3. For this calculation, the temperature distribution calculator 4 reads the physical properties (including mass density, specific heat, thermal conductivity) of silica and the physical properties (including mass density, specific heat, thermal conductivity) of the mold stored in the physical property memory 7. Then, the temperature distribution calculator 4 calculates the temperature distribution of the silica powder molded body and the mold, using the obtained physical properties and using, as boundary conditions, the heat flux due to the supplied convection and radiation, and the temperature of the above-mentioned fluid. For this calculation, the temperature at the initial state of the silica powder molded body is set to room temperature.

The temperature distribution calculator 4 calculates the temperature distribution of the silica powder molded body and the mold in the thickness direction of the silica powder molded body, using the above-calculated heat flux and using the formula (3) below for heat flux.

$$q+P=-\lambda(dT/dx) \tag{3}$$

Here, $\lambda$ is a thermal conductivity, x is a distance from the inner surface of the silica powder molded body, T is a temperature difference (difference in temperature between the inner surface of the silica powder molded body and the outer surface).

2-5. Model Memory 6

The model memory 6 stores information of the analytical space (FIG. 2), information of the meshes for the analytical space (FIG. 4), gas flow conditions as heat transfer model of the plasma flow, radiation conditions which are heat transfer model of the radiation from the arc electrodes, in connection with the identification information (e.g. name) thereof.

2-6. Physical Property Memory 7

The physical property memory 7 stores the physical properties of the analysis objects such as silica (in this case, quartz) (mass density, specific heat, thermal conductivity), the mold (mass density, specific heat, thermal conductivity), the atmosphere (the air: mass density, thermal conductivity, thermal expansion coefficient, absolute viscosity, isobaric specific heat, gas constant), in connection with the identification information (for example, name, number) thereof.

It should be noted that because the silica powder molded body is made of powdery silica and thus the physical properties are not completely identical to those of bulk silica. Furthermore, the silica powder molded body may have an inner surface layer of synthetic silica powder and an outer layer of natural silica powder. In this case, the physical properties of the synthetic silica powder are not completely identical to those of the natural silica powder. Therefore, for the physical properties of the silica, values obtained in consideration of the fact that it is powdery and the kind of the silica powder can be used.

The synthetic silica powder is silica powder obtained by chemical synthesis such as gas phase oxidation of silicon tetrachloride ($SiCl_4$) (dry synthesis method) or hydrolysis of silicon alkoxide ($Si(OR)_4$) (sol-gel method), and is amorphous. The natural silica powder is silica powder obtained by pulverizing natural mineral mainly consisting of a-quartz, and is crystalline.

For silica, thermal conductivity is set for each of the predetermined temperature ranges. For mold, specific heat is set for each of the predetermined temperature ranges. For the air, absolute viscosity is set for each of the predetermined temperature ranges. Therefore, the temperature distribution calculator 4 reads physical properties of the silica, the mold, and the air in response to the temperature calculated just before for each of the meshes, and performs calculation.

As previously described, in the present embodiment, the temperature distribution on the surface and inside of the silica powder molded body and the inside of the mold is calculated using the finite element method, based on the heat flux which is the sum of the heat flux due to heat convection to the silica powder molded body and the heat flux due to radiation to the silica powder molded body.

Furthermore, in the present embodiment, the heat convection calculator 2, the radiation heat amount calculator 3 and the temperature distribution calculator 4, in calculation of the temperature distribution, change the physical properties of the meshes, mesh-by-mesh, of the silica powder molded body in response to the temperature distribution by reading, from the physical property memory 7, the physical properties in response to the temperature. Furthermore, the temperature distributions for the powdery state, the melted state, and the solidified state are calculated without changing the shape of the meshes.

Figure 6:
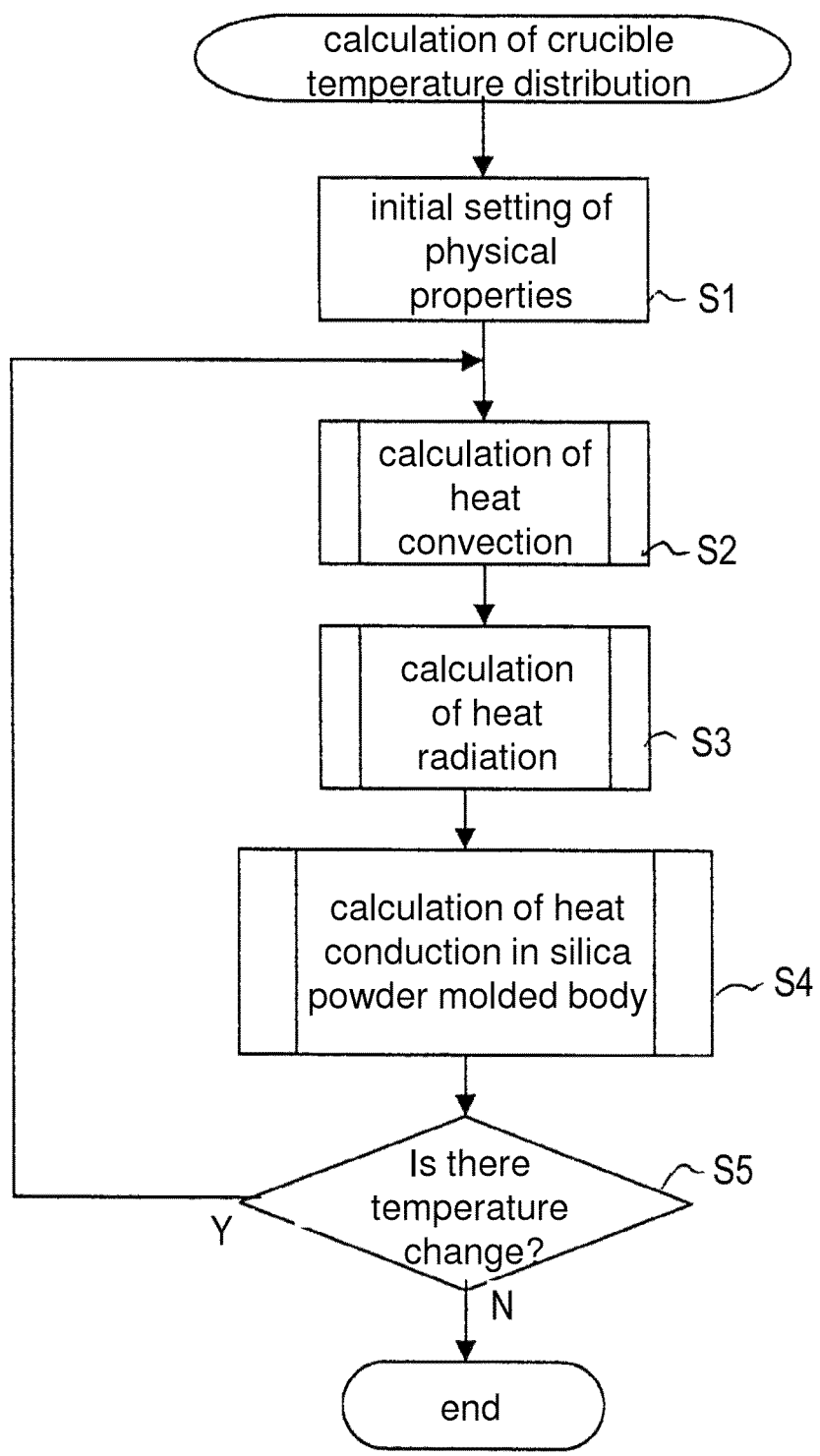
FIG. 6 is a flowchart showing an example of operation of the calculation process of a temperature distribution performed by an apparatus for calculating a temperature distribution according to the present embodiment.

3. Explanation of Operation of Apparatus for Calculating Temperature Distribution Next, with reference to FIG. 6, the operation of the apparatus for calculating a temperature distribution of a silica powder molded body during manufacturing, according to the present embodiment. FIG. 6 is a flowchart illustrating an example of calculating process of a temperature distribution in three dimensional space of the analysis object using the finite element method by the apparatus for calculating a temperature distribution, according to the present embodiment.

3-1. Initial Setting of Physical Properties (Step S1)

Mesh division of each of the analysis regions in the analytical space shown in FIG. 2 has already been done as shown in FIG. 4. As previously explained, in order to form a correspondence table or relational expression, gas flow conditions and radiation conditions corresponding to the position of the arc electrodes and the discharge current are adjusted. As initial values for this adjustment, values calculated from the formulas below are used.

The heat convection calculator 2 reads, from the model memory 6, the analytical space shown in FIG. 4 and writes it to the processing memory (not shown). The analytical space is divided into meshes as shown in FIG. 4. The heat convection calculator 2 reads, from the model memory 6, gas flow conditions corresponding to the position of the arc electrodes and discharge current, and also reads, from the physical property memory 7, physical properties of the air corresponding to the temperature (Step S1).

3-2. Calculation of Heat Convection (Step S2)

Figure 7:
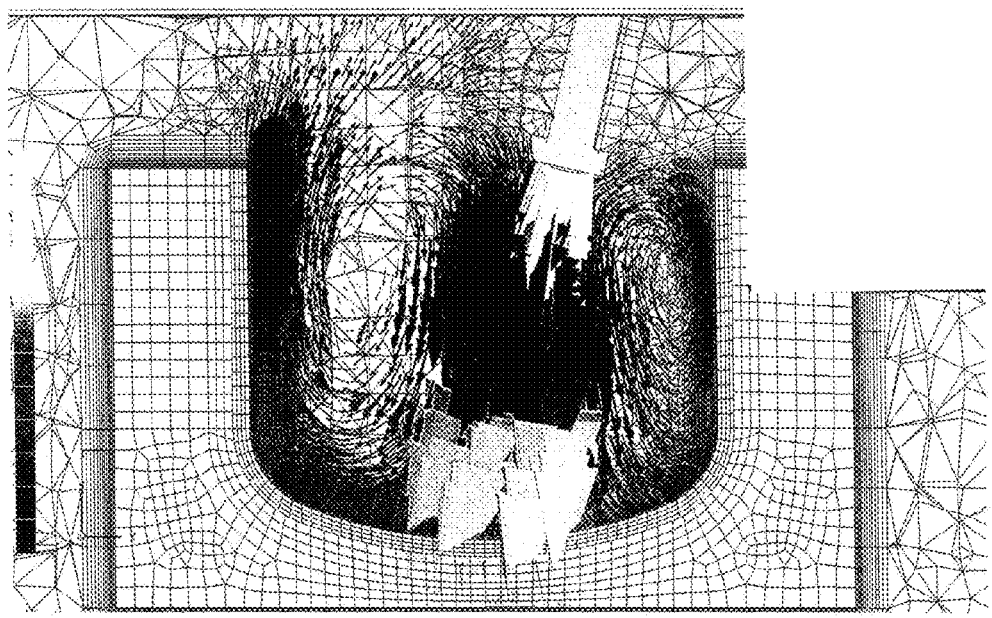
FIG. 7 is a conceptual diagram showing the result of analysis of the velocity vector of the heat convection in three dimensional space on a cross-section vertical to the plane of the opening of a silica powder molded body and including the center of the opening.

Next, the heat convection calculator 2 calculates, using the finite element method, the heat convection in the above-mentioned analytical space, using the obtained gas flow conditions and physical properties (Step S2). Then, the heat convection calculator 2 calculates the velocity vector of the thermal fluid inside of the silica powder molded body as shown in FIG. 7. FIG. 7 illustrates a conceptual diagram showing the result of the analysis of the velocity vector in three dimensional space. FIG. 7 is a sectional view cut out by the plane vertical to the plane of the opening of the silica powder molded body and including the central point of the opening.

Then, the heat convection calculator 2 calculates the temperature distribution of each layer of the layer meshes of the thermal fluid based on the velocity vector, the heat amount, and the physical properties of the air.

Next, the heat convection calculator 2 calculates the heat flux from the calculated temperature distribution, and the heat flux q between the thermal fluid and the inner surface of the silica powder molded body based on the formulas (1) and (2).

3-3. Calculation of Heat Radiation (Step S3)

Next, the radiation heat amount calculator 3 reads, from the model memory 6, the radiation conditions corresponding to the position of the arc electrodes and the discharge current and discharge voltage (discharge power), and calculates, using the formula (3) by the finite element method, the heat flux P for each portion (irradiated surface), facing the arc electrodes, of the inside of the silica powder molded body 3-4. Calculation of Heat Conduction in Silica Powder Molded Body (Step S4)

Once the heat flux q and the heat flux P are calculated, the temperature distribution calculator 4 reads, from the physical property memory 7, the physical properties of the silica and the mold, and calculates the temperature distribution in the silica powder molded body and the mold, using, as boundary conditions, the heat flux which is the sum of the heat flux q and the heat flux P (Step S4).

3-5. Judgment of Whether There is Temperature Change (Step S5)

Once the temperature distribution is calculated, the temperature distribution calculator 4 calculates, for each node of the meshes, the difference between the newly calculated temperature distribution data and the just previously calculated temperature distribution data. Then, the temperature distribution calculator 4 selects the smallest difference among the calculated differences, and judges whether the difference is within the predetermined range (Step S5).

If the difference is within the predetermined range for all of the nodes, the temperature distribution calculator 4 determines that the calculation of the temperature distribution has converged, and terminates the temperature distribution calculation process. If the difference is out of the predetermined range for any of the nodes, the process goes to Step S2.

Furthermore, the temperature distribution calculator 4 may be configured to, in accordance with the control sequence (to be explained), determine if the preset time has passed and, if so, terminate the temperature distribution calculation within that period, and thereafter change the position of the arc electrodes to calculate the temperature distribution again.

When the difference is not within the range, the process goes back to Step S1, as explained above. Then, the processes from Step 1 to Step 5 are repeated. Then, the heat convection calculator 2 and the radiation heat amount calculator 3 newly calculate, including the temperature change caused to the silica powder molded body due to heat transfer, the heat flux q and the heat flux P, using, as boundary conditions, the temperature of the inner surface of the silica powder molded body.

The temperature distribution calculator 4 calculates the temperature distribution of the inside of the silica powder molded body and the mold, using, as boundary conditions, the heat flux which is the sum of the newly calculated heat flux q and heat flux P.

4. Detailed Explanation of Calculation of Heat Convection (Step S2)

Figure 8:
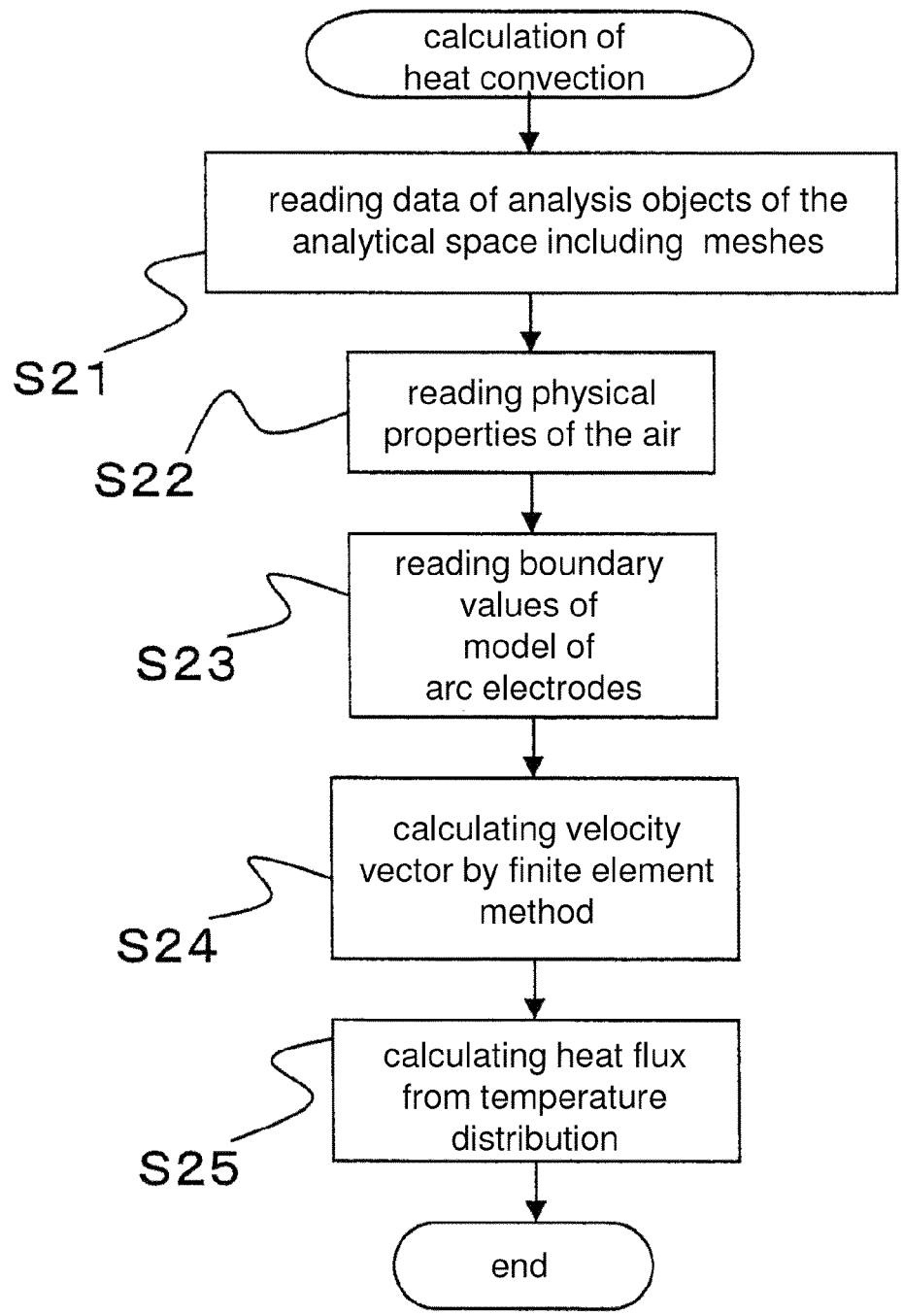
FIG. 8 is a flowchart showing an example of operation of calculation of heat convection in Step S2 of FIG. 6.

Next, with reference to FIG. 8, the calculation of the heat convection in Step S2 of FIG. 6 is explained. FIG. 8 is a flowchart illustrating an example of the calculation of the heat convection in Step S2.

The heat convection calculator 2 reads, from the model memory 6, data of each of the analysis objects of the analytical space (Step S21). The data includes data of the meshes shown in FIG. 4. Then, the heat convection calculator 2 writes the data in the processing memory.

Furthermore, the heat convection calculator 2 reads, from the physical property memory 7, the physical properties of the air shown in FIG. 5 (Step S22), and reads, from the model memory 6, the gas flow conditions which are the boundary conditions of the heat transfer model of the arc electrodes (Step S23).

Then, the heat convection calculator 2 calculates, using the finite element method, the distribution of the velocity vector of the heat convection in the analytical space, as shown in FIG. 7, using the above mentioned gas flow conditions and physical properties. Then, the heat convection calculator 2 calculates, from the velocity distribution, the function f(s) of the temperature distribution (Step S24).

At this time, as previously mentioned, the function f(s) of the temperature distribution in the direction vertical to the inner surface of the silica powder molded body is formed. The function f(s) is similar to a log function corresponding to the flow of the thermal fluid. The function f(s) is formed based on the three-layer layer meshes which are disposed near the inner surface of the silica powder molded body and whose thicknesses are different from one another.

Once the function of the temperature distribution is calculated, the heat convection calculator 2 calculates, using the formula (1), the heat flux q according to the function f(s) of the temperature distribution (Step S25).

5. Detailed Explanation of The Calculation of The Heat Radiation (Step S3)

Figure 9:
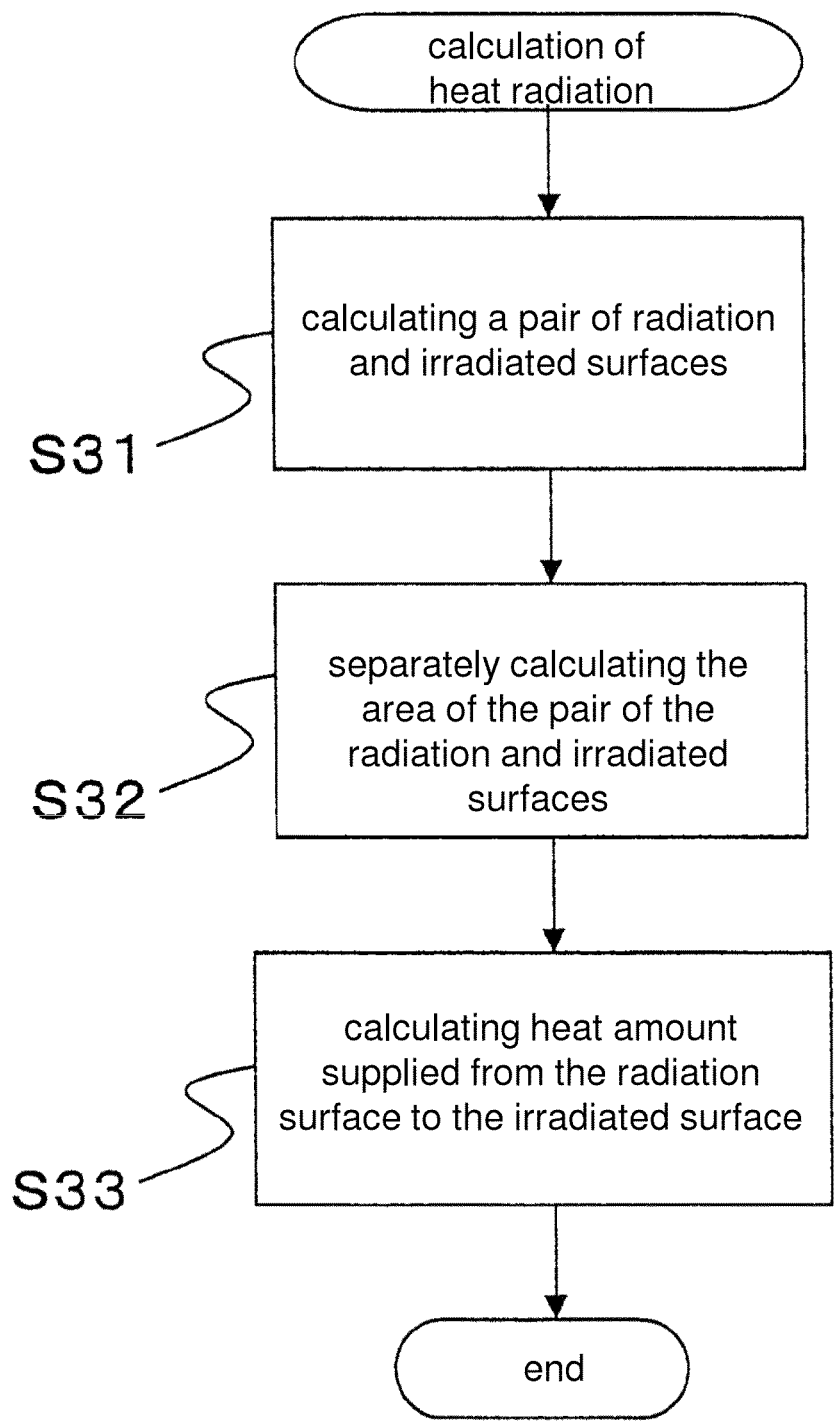
FIG. 9 is a flowchart showing an example of operation of calculation of heat radiation in Step S4 of FIG. 6.

Next, with reference to FIG. 9, the calculation of the radiation in Step S3 of FIG. 6 is explained. FIG. 9 is a flowchart illustrating an example of the calculation of the radiation in Step S3.

The radiation heat amount calculator 3 forms a set of a radiation surface generating the radiation from the arc electrodes, and an irradiated surface facing the radiation surface and irradiated with heat amount (Step S31).

Here, the radiation heat amount calculator 3 forms the irradiated surfaces by dividing the inner surface of the silica powder molded body so as to correspond to the number of the radiation surfaces. The irradiated surfaces include the meshes of the inner surface of the silica powder molded body, and each of the meshes is positioned on an extended line of a normal line of a plane of the radiation surface.

Then, once the irradiated surfaces are calculated, the radiation heat amount calculator calculates the area of the each of the irradiated surfaces (Step S32).

Next, the radiation heat amount calculator 3 reads, from the model memory 6, the radiation conditions, and calculates the amount of heat radiating from the radiation surfaces to each of the irradiated surfaces, i.e. the heat flux P, based on the radiation conditions and the node temperature of the meshes of each of the irradiated surfaces, using the formula (3) (Step S33).

6. Detailed Explanation of the Calculation of the Heat Conduction in the Silica Powder Molded Body (Step S4)

Figure 10:
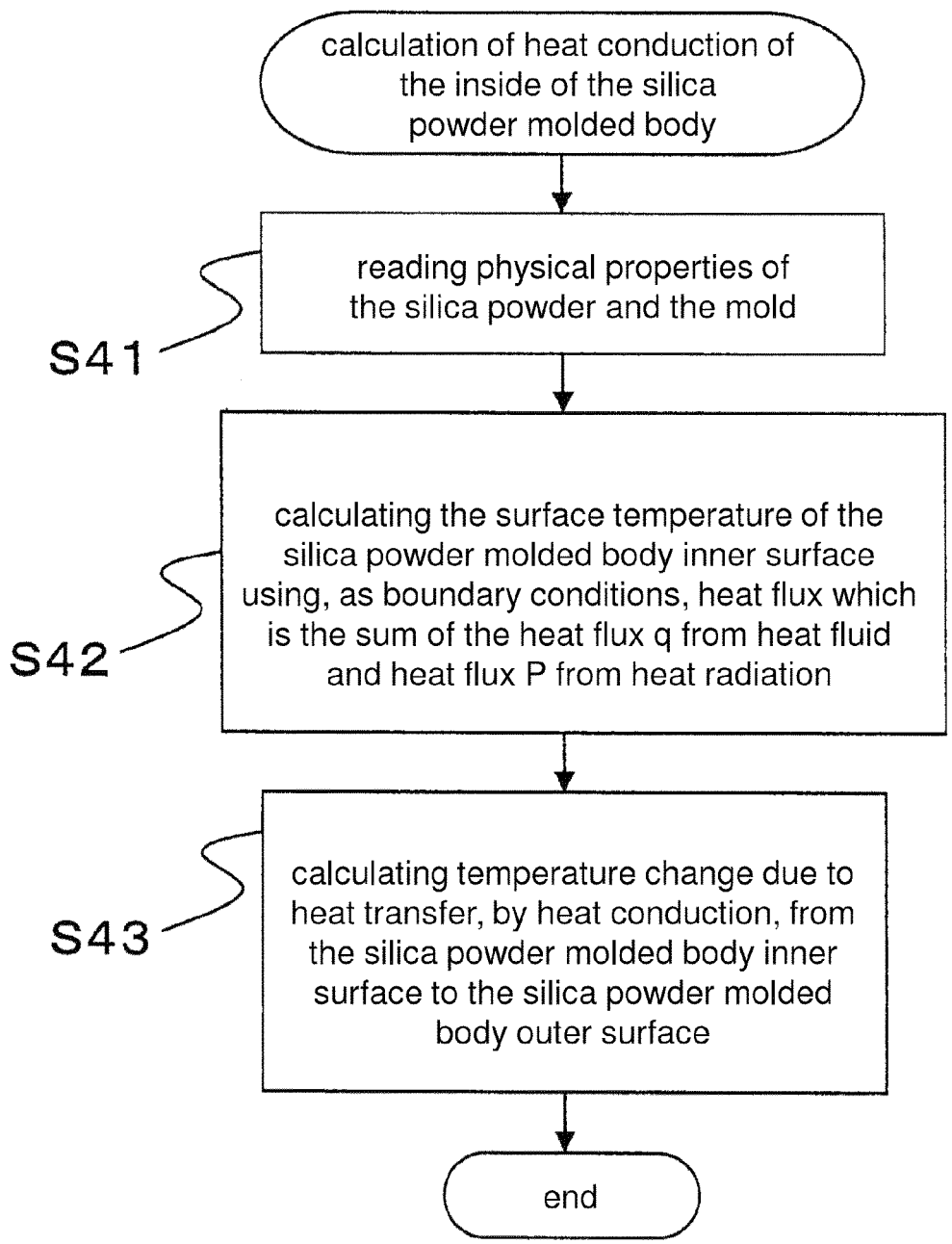
FIG. 10 is a flowchart showing an example of operation of calculation of heat conduction in the silica powder molded body in Steps S3 and S5 of FIG. 6.

Next, with reference to FIG. 10, the calculation of the heat conduction inside of the silica powder molded body in Step S4 of FIG. 6 is explained. FIG. 10 is a flowchart illustrating an example of the calculation of the heat conduction in the silica powder molded body and the mold according to the heat flux q and the heat flux P in Step S4.

In the flowchart in FIG. 10, the temperature distribution calculator 4 reads, from the model memory 6, the physical properties of the silica powder and the mold shown in FIG. 5 (Step S41).

Then, the temperature distribution calculator 4 calculates the node temperature of the meshes in the first layer of the inner surface of the silica powder molded body, using the formula (4), based on the physical properties of the silica powder and the mold, the temperature distribution of the silica powder molded body and the mold, and the heat flux which is the sum of the heat flux q and heat flux P (Step S42).

Next, the temperature distribution calculator 4 calculates the temperature change due to the heat transfer from the inner surface of the silica powder molded body to the outer surface of the silica powder molded body through heat conduction. Then, the temperature distribution calculator 4 calculates the temperature change due to the heat transfer from the mold inner surface contacting the outer surface of the silica powder molded body to the mold outer surface, and calculates, according to the formula (4), the temperature distribution inside of the silica powder molded body and inside of the mold, to finish the process (Step S43).

Calculation of the above-mentioned temperature distribution is performed assuming that the position of the arc electrodes is the position from which the gas flow is released and the heat radiates, and the position of the plane of the opening of the silica powder molded body is the vertical direction reference position of the height direction, and the center of the opening of the silica powder molded body is the horizontal direction reference position.

Then, the position of the arc electrodes is vertically displaced with reference to the above-mentioned vertical direction reference position to change the position in the vertical direction, and horizontally displaced from the center reference position to change the position in the horizontal direction, and then the temperature distribution of the silica powder molded body and the mold is calculated for each of the positions of the arc electrodes.

7. Generation of Correspondence Table or Relational Expression by Comparison Between the Actually Measured Value and the Calculated Value of the Temperature The temperature of each of the positions (a sidewall, a bottom, and a corner portion disposed therebetween) of the inner surface of the silica powder molded body for the cases where the position of the arc electrodes is vertically displaced with reference to the vertical direction reference position, and horizontally displaced with reference to the horizontal direction reference position, and the obtained result is compared with the result of the calculation of the temperature distribution.

For example, FIG. 11 is a table showing two kinds of boundary conditions of Analysis A and Analysis B, which are the models of the radiation and the convection of the heat plasma.

Figure 12:
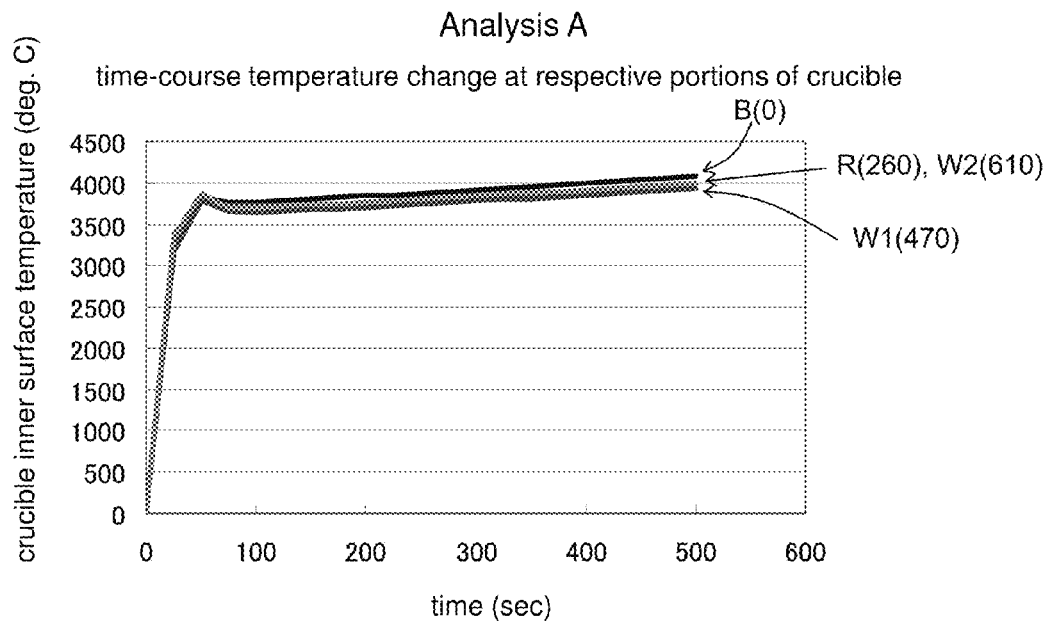
FIG. 12 is a graph showing a time-course temperature change, of a silica powder molded body, calculated by a simulation.
Figure 13:
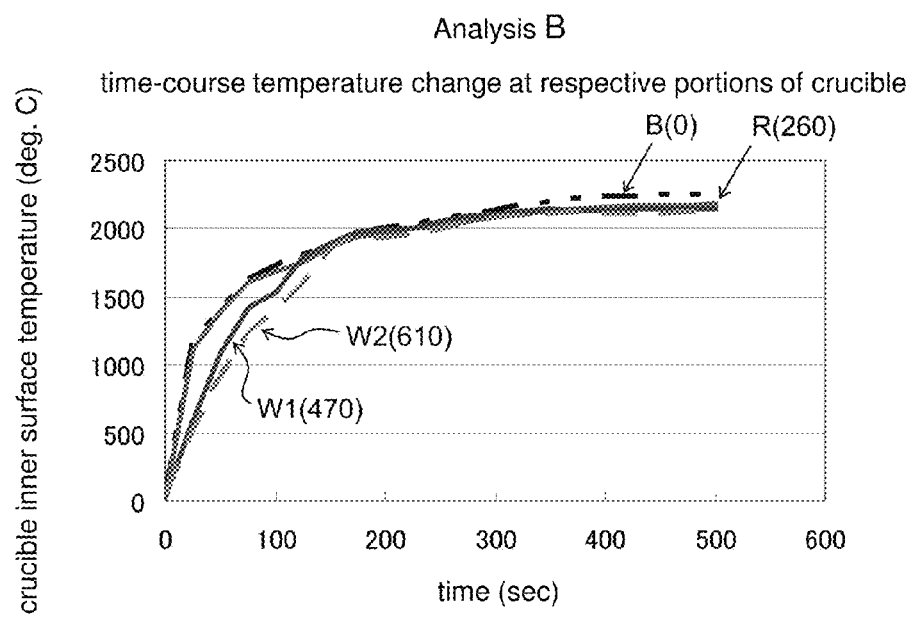
FIG. 13 is a graph showing a time-course temperature change of the bottom portion (B), corner portion (R) and sidewall (W1: lower portion, W2 upper portion) of the silica powder molded body in the calculation result according to Analysis B.

In the conditions of Analysis A, as is clear from the comparison between FIGS. 12 and 13, because the amount of heat from the radiation is larger than that of the convection of the gas flow, the temperature is rapidly increasing.

The actually measured temperature of the electrodes was 3000 deg. C., and it was found that the amount of heat from the radiation was larger than the actual value. So, in the conditions of Analysis B, the amount of heat from the convection of the gas flow was increased so as to be larger than that of the radiation. As the result, the profile of the temperature increase obtained in Analysis B was closer to the actual profile, compared with Analysis A. This comparison was made between FIG. 12 (calculation result according to Analysis A) and FIG. 13 (calculation result according to Analysis B).

Here, FIG. 12 is a graph showing a time-course temperature change of the bottom portion (B), corner portion (R) and sidewall (W1: lower portion, W2 upper portion) of the silica powder molded body in the calculation result according to Analysis A. The horizontal axis shows the time-lapse from the start of the heating, and the vertical axis shows the temperature.

On the other hand, FIG. 13 is a graph showing a time-course temperature change of the bottom portion (B), corner portion (R) and sidewall (W1: lower portion, W2 upper portion) of the silica powder molded body in the calculation result according to Analysis B. The horizontal axis shows the time-lapse from the start of the heating, and the vertical axis shows the temperature.

Figure 14:
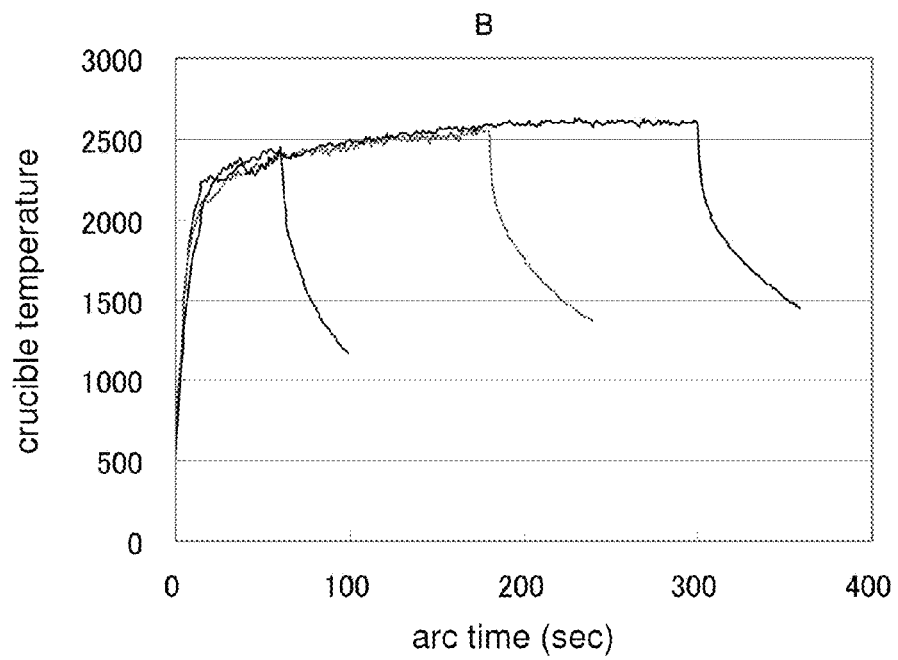
FIG. 14 a graph showing a time-course temperature change of the bottom portion (B) of the silica powder molded body in the measurement result (actual measurement).

FIG. 14 a graph showing a time-course temperature change of the bottom portion (B) of the silica powder molded body in the measurement result (actual measurement). The horizontal axis shows the time-lapse from the start of the heating, and the vertical axis shows the temperature.

Figure 15:
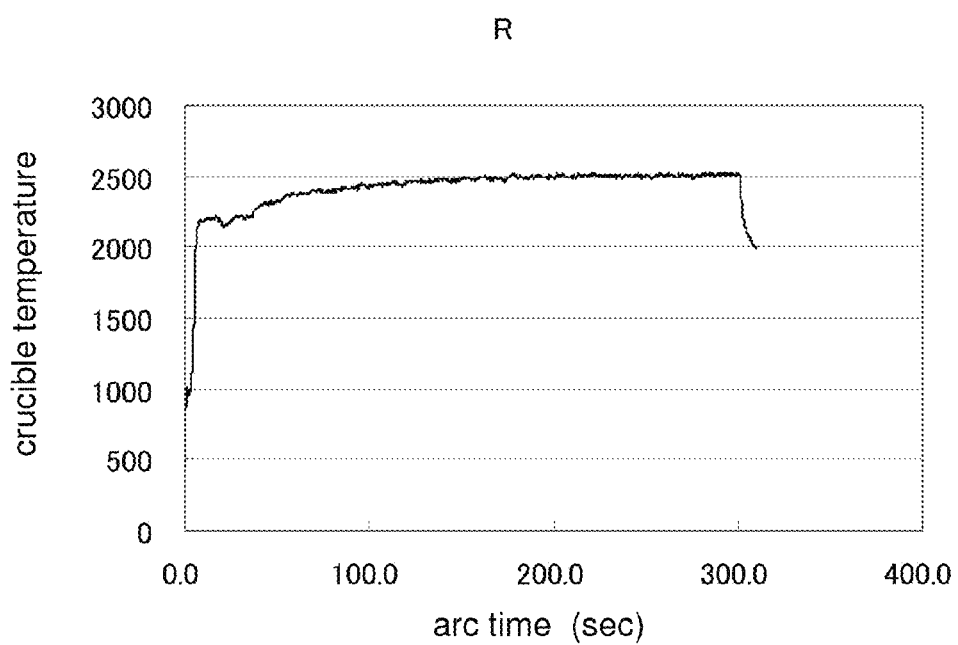
FIG. 15 is a graph showing a time-course temperature change of the corner portion (R) in the measurement result (actual measurement).

FIG. 15 is a graph showing a time-course temperature change of the corner portion (R) in the measurement result (actual measurement). The horizontal axis shows the time-lapse from the start of the heating, and the vertical axis shows the temperature.

Figure 16:
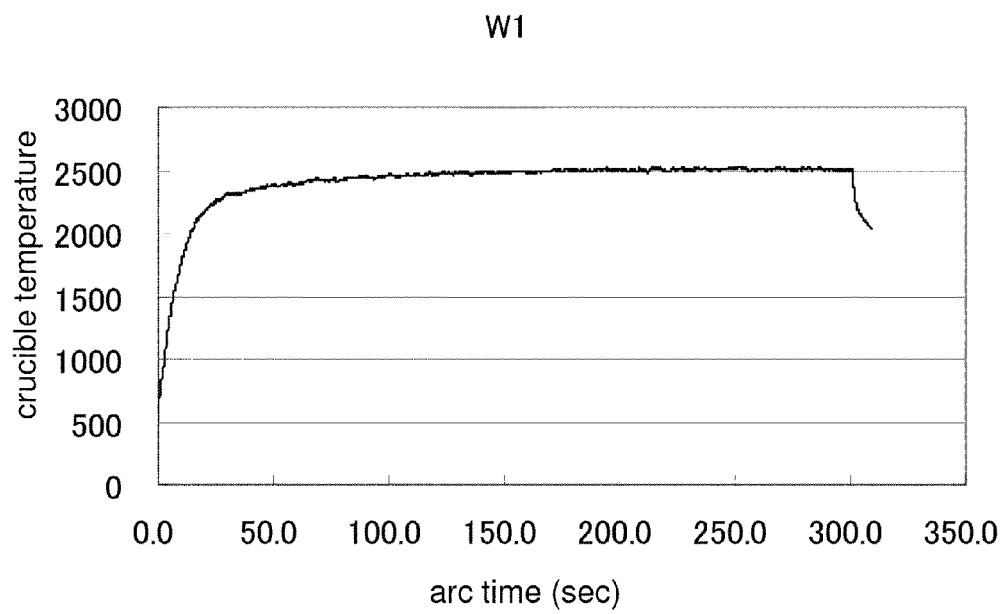
FIG. 16 is a graph showing a time-course temperature change of the sidewall (W1: lower portion) in the measurement result (actual measurement).

FIG. 16 is a graph showing a time-course temperature change of the sidewall (W1: lower portion) in the measurement result (actual measurement). The horizontal axis show the time-lapse from the start of the heating, and the vertical axis shows the temperature.

Figure 17:
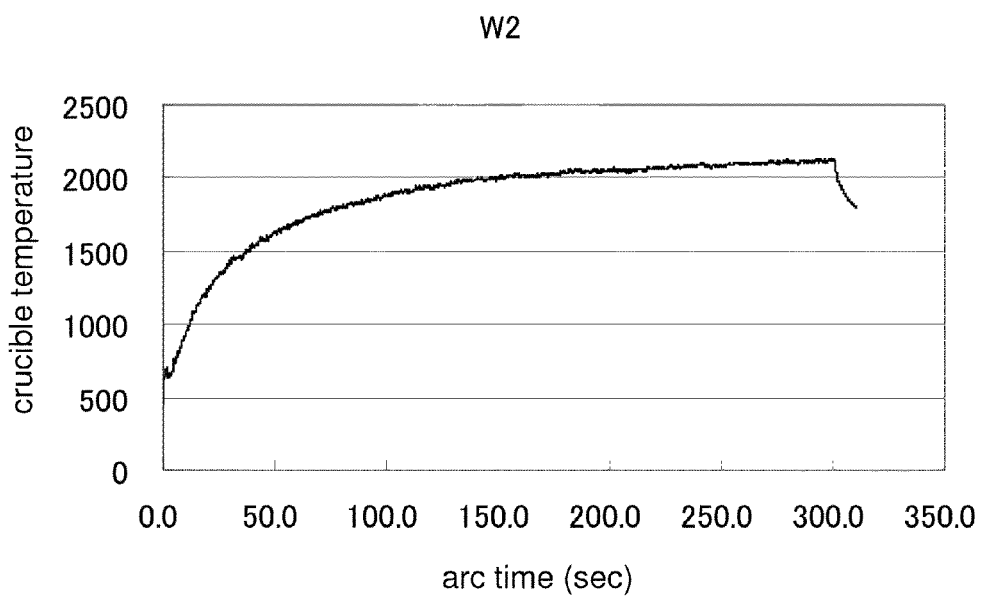
FIG. 17 is a graph showing a time-course temperature change of the sidewall (W2: upper portion) in the measurement result (actual measurement).

FIG. 17 is a graph showing a time-course temperature change of the sidewall (W2: upper portion) in the measurement result (actual measurement). The horizontal axis shows the time-lapse from the start of the heating, and the vertical axis shows the temperature.

It can be seen that the maximum temperature measured at each of the points on the inner surface of the silica powder molded body is close to that in Analysis B. This shows that the amount of heat from the convection of the gas flow is dominant for the temperature change on the silica powder molded body inner surface.

As mentioned above, the boundary conditions of the models of the heat convection and the radiation are adjusted so that the calculated results match the actually measured temperatures at the temperature measurement points shown in FIG. 22. Thus, the calculated values and the actually measured values are matched to create the correspondence table or relational expression showing, for each of the positions of the arc electrodes, the relationship between the discharge current of the arc electrodes and the gas flow conditions and radiation conditions.

When the arc electrodes are at the vertical direction reference position and horizontal direction reference position and the discharge current is for a power of 2000 kW (the voltage 380 V(volt), and 3000 A(ampere)), the boundary conditions, consisting of the gas flow conditions and radiation conditions, obtained from the correspondence table or relational expression are as follows. The radiation temperature in the radiation is 3450 K, the radiation heat amount is 400 kW, the initial velocity of the gas flow is 19 m/sec, the gas temperature is 28000 K, and the convection heat amount is 1600 kW.

In the calculation according to the finite element method using these boundary conditions, Analysis B produced values close to the actually measured values for the temperature change at the bottom (B portion) of the silica powder molded body, the temperature change at the sidewall (W1 portion, W2 portion) of the silica powder molded body, and the temperature distribution at the corner portion (R portion) positioned at the interface of the bottom portion and the sidewall portion of the silica powder molded body. Thus, Analysis B has reproduced the actual temperature increase.

Figure 18:
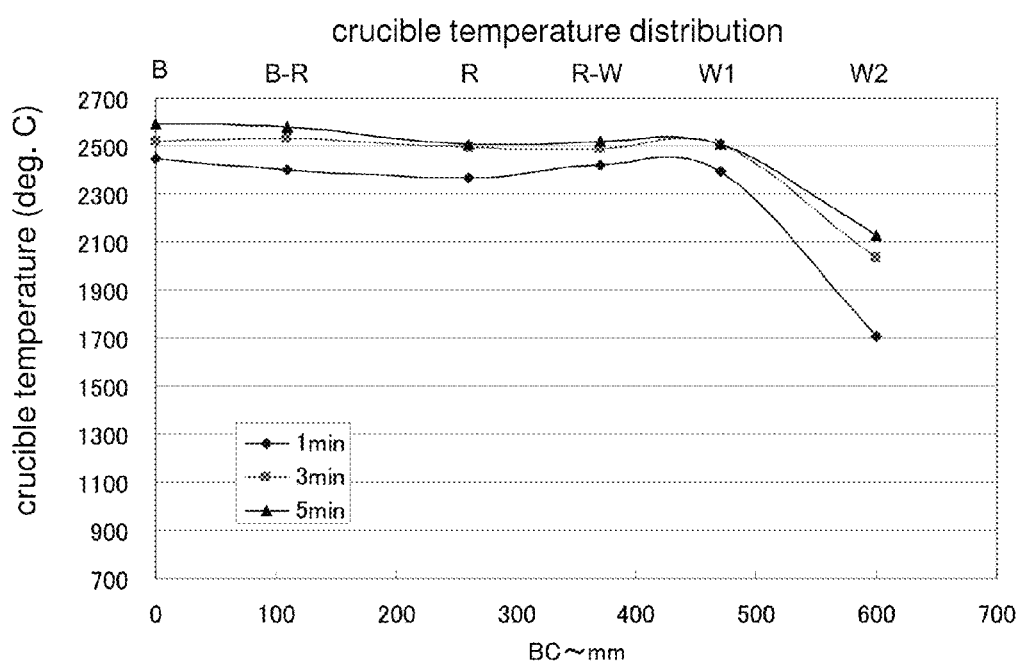
FIG. 18 shows a time-course (1 min, 3 min, 5 min) change in the temperature actually measured at the bottom portion (B portion), sidewall (W1 portion, W2 portion), corner portion (R portion) of the inside surface of the silica powder molded body.

FIG. 18 shows a time-course (1 min, 3 min, 5 min) change in the temperature actually measured at the bottom portion (B portion), sidewall (W1: lower portion, W2 upper portion), corner portion (R portion) of the inside surface of the silica powder molded body. The horizontal axis shows the distance from the center of the bottom portion (B portion), and the vertical axis shows the temperature.

This figure shows that the temperature increase at the bottom is faster and larger than the sidewall portion W2 which is closer to the arc electrodes. This indicates that the convection heat amount contributes to the temperature increase on the inner surface of the silica powder molded body more largely than a heat amount due to the radiation from the arc electrodes. This result supports that the model in Analysis B is more accurate than that in Analysis A where the radiation heat is dominant.

This conclusion is clear because if the radiation heat is dominant, the sidewall W2 should have shown the fastest temperature increase, but in reality, the bottom portion to which the gas flow is directly applied showed the fastest temperature increase.

Figure 19:
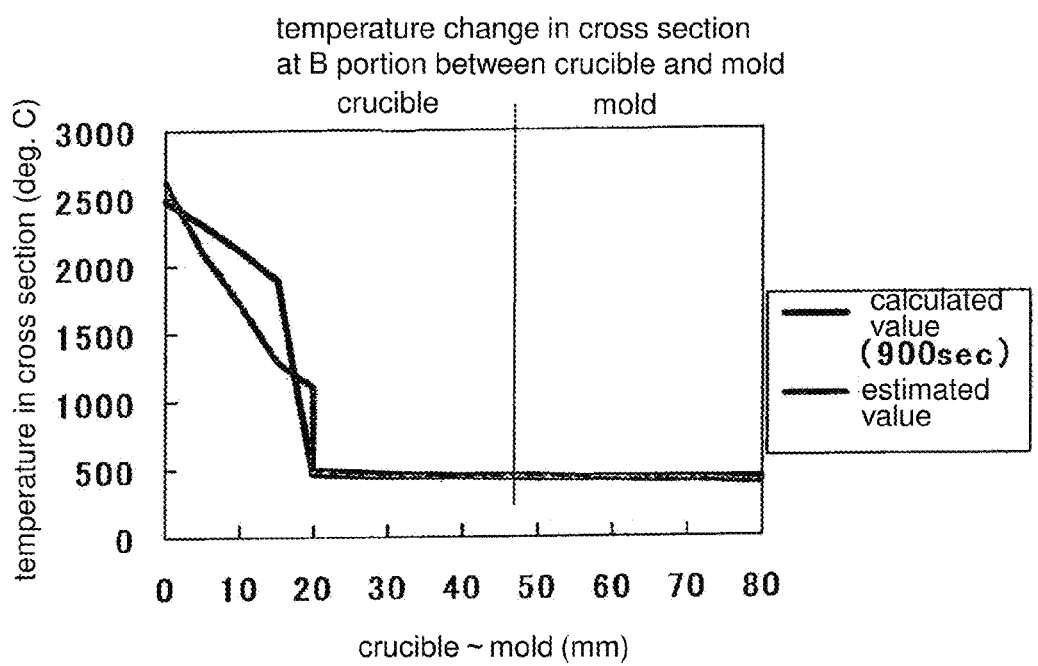
FIG. 19 shows the temperature distribution in the thickness direction for the object including the mold, obtained from the calculation based on the conditions in Analysis B

FIG. 19 shows the temperature distribution in the thickness direction for the object including the mold, obtained from the calculation based on the conditions in Analysis B and the actual measured values. The horizontal axis shows the distance from the inner surface of the silica powder molded body to the outer surface of the mold, and the vertical axis shows the temperature.

As mentioned above, the convection heat amount by the plasma flow from the arc electrodes is dominant for the heating of the inner surface of the silica powder molded body. For example, the ratio of the heat amount is "the convection heat amount: the radiation heat amount=4:1".

Figure 20:
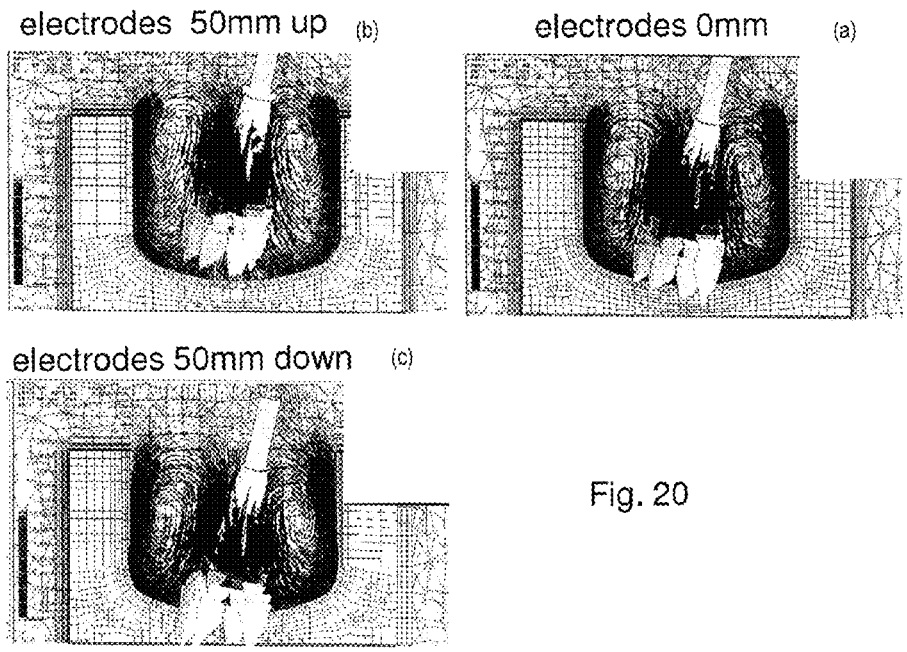
FIG. 20 shows a velocity vector for the cases where the vertical position of the arc electrodes is changed without changing the horizontal position of the arc electrodes
Figure 21:
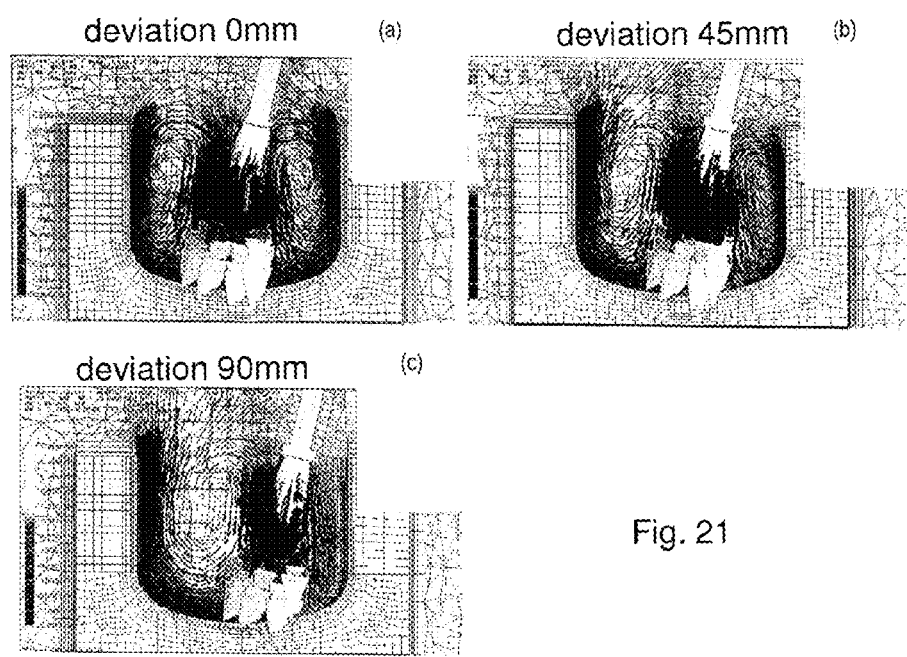
FIG. 21 shows a velocity vector for the cases where the horizontal position of the arc electrodes is changed without changing the vertical position of the arc electrodes

8. Temperature Distribution for the Cases Where the Position of the Arc Electrodes is Displaced The position of the arc electrodes is displaced from the vertical direction reference position and horizontal direction reference position, without changing the gas flow conditions and radiation conditions. Then, as shown in FIGS. 20 and 21, the velocity vector of the heat convection is calculated using the finite element method. Then, as mentioned above, the heat-transfer coefficient from the gas flow in the heat convection to the silica powder molded body inner surface is calculated to calculate the temperature distribution in the silica powder molded body.

FIG. 20 shows the velocity vector for the cases where the positions of the arc electrodes are at the vertical direction reference position (FIG. 20(a)), at 50 mm above from the vertical direction reference position (FIGS. 20(b)), and 50 mm below from the vertical direction reference position (FIG. 20(c)) without changing the horizontal position of the arc electrodes As seen from FIG. 20(a), when the position of the arc electrodes is at 50 mm above from the vertical direction reference position, the velocity vector at the region near the opening of the silica powder molded body, i.e. at the upper sidewall portion of the inner surface of the silica powder molded body is larger than other inner portions of the silica powder molded body.

Furthermore, as seen from FIG. 20(b), when the arc electrodes is at the vertical direction reference position, the calculation result shows that the velocity vector at the portion lower than the opening is larger than the portion near the opening. This result indicates that a portion reaching the melting temperature have moved to a lower portion.

In addition, as seen from FIG. 20(c), the velocity vector at the bottom of the silica powder molded body has become large.

When the plasma flow released from the electrodes to the upper side of the crucible upper end increases, cool air gets into the crucible and the energy of the heat flow rate to the crucible is lowered.

The result shown in FIG. 20(a) shows that the sidewall near the opening reaches the melting temperature quickly when the heat radiation is taken into account, and the position coincides with the position in actual manufacturing of the crucible That is, in the actual manufacturing, the discharge at the arc electrodes is started with the arc electrodes at the position deviated upwardly from the vertical direction reference position to start fusing the opening portion. Then, the arc electrodes are gradually lowered to a certain height, and then the arc electrodes are moved upwardly.

FIG. 21 shows the velocity vector for the cases where the positions of the arc electrodes are at the horizontal direction reference position (FIG. 21(a)), at 45 mm right from the horizontal direction reference position (FIG. 21(b)), and at 90 mm left from the vertical direction reference position (FIG. 21(c)) without changing the vertical position of the arc electrodes.

Similarly to FIG. 20, the velocity vector of FIG. 21 is paid attention to. As the arc electrodes approach one sidewall of the silica powder molded body inner space, the velocity vector of the convection on the side becomes smaller than that on the opposite side. This indicates that the rate of heat transfer by the heat flow is slower, and thus the temperature increase is slower on the opposite side. Therefore, this indicates that it is the most efficient to place the arc electrodes on the center.

Then, for each of the positions of the arc electrodes, the actually measured temperature of the inner surface of the silica powder molded body is compared with that of the above calculated temperature of the inner surface of the silica powder molded body in order to adjust the gas flow conditions and radiation conditions. Then, the adjustment is performed in a way to match the calculated time-course temperature and the actually measured time-course temperature, for example, at all measurement points shown in FIG. 5.

As a result, a correspondence table can be created by adjusting the gas flow conditions and radiation conditions based on the current value of the discharge current supplied to the arc electrodes for generating the plasma flow.

By use of the correspondence table (or relational expression) showing the relationship between the discharge current and discharge voltage and the gas flow conditions and radiation conditions, in calculating the temperature distribution of the silica powder molded body, the gas flow conditions and radiation conditions used for the calculation can be obtained through calculation based on the discharge current to be used in the crucible manufacturing.

Thus, the relationship between the values of the discharge current and discharge voltage used for manufacturing a crucible and the gas flow conditions and radiation conditions corresponding to the current value can be obtained. The correspondence table (or relational expression) is stored in the model memory 6.

9. Utilization of Temperature Distribution for Creating Control Sequence for a Crucible According to the above results, the position arc electrodes is changed according to the preset time unit so as to correspond to the actual crucible manufacturing process, to calculate the temperature distribution of the silica powder molded body at a constant frequency.

That is, as shown in FIG. 22, in a manufacturing process of a crucible, the arc electrodes are vertically moved up and down when fusing the silica powder molded body formed on the inner surface of the mold which is a mold of the crucible, to manufacture the crucible.

The discharge current (dependent on the discharge voltage) supplied to the arc electrodes is also controlled in each of the steps of the above control sequence.

Figure 23:
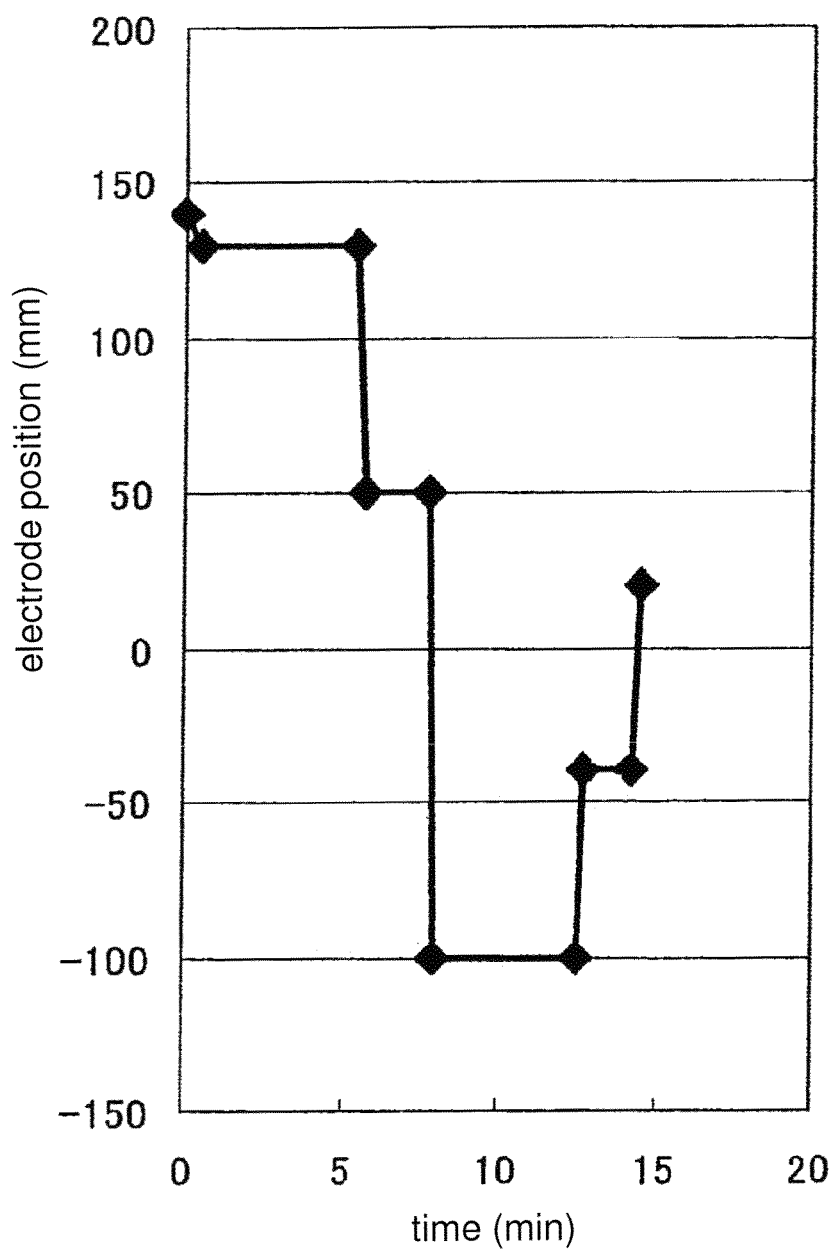
FIG. 23 is a conceptual diagram showing an example of a control sequence for a crucible manufacturing process.

For example, as the control sequence of the position of the arc electrodes for the crucible manufacturing process, the control shown in FIG. 23 is performed.

Thus, according to this control sequence, the position of the arc electrodes is changed and the gas flow conditions and radiation conditions are changed when time point set in the control sequence has passed, while rotating the silica powder molded body around a rotation axis which passes through the center of the opening of the silica powder molded body and which is vertical to the plane of the opening.

Then, the time-course change of the temperature distribution of the silica powder molded body is calculated using the finite element method. By doing this, the time-course change of the temperature distribution of the silica powder molded body is obtained for each of the steps of the sequence. Then, the state of silica powder, the melted state, and the melted and solidified state, and the speed to change to the state are estimated.

This enables the detection of the melting speed of the silica powder molded body according to the change of the temperature distribution of the silica powder molded body. Then, the shape (e.g. thicknesses of the bottom portion, corner portion and sidewall) of the manufactured crucible, and the amount of bubbles introduced into the crucible can be estimated.

Therefore, when a new control sequence for manufacturing a crucible is designed, the horizontal or vertical movement of the arc electrodes, or the heating time at each of the positions of the arc electrodes can be simulated for the cases where the discharge current supplied to the arc electrodes and the applied discharge voltage are changed. Thus, a large amount of experiments are no longer necessary, and thus the manufacturing cost related to the experiments can be reduced.

Furthermore, the temperature distribution, of the crucible inner surface, actually measured in manufacturing a crucible is compared with the temperature distribution, of the silica powder molded body surface, calculated in the temperature distribution calculation process. For this comparison, the control sequence generated using the correspondence table (or relational expression) is used. In addition, the same conditions as to the position of the arc electrodes, the discharge current and discharge voltage, and time-lapse are applied. The result of the comparison can be used to correct the gas flow conditions and the radiation conditions to be used as boundary conditions, corresponding to the position of the arc electrodes and the discharge current in the correspondence table (or relational expression) so as to improve the accuracy of the calculation of the temperature distribution.

10. Movement of the Arc Electrodes in the Sequence Control

The condition changer 5 vertically or horizontally moves the arc electrodes in the sequence control. The condition changer 5, in accordance with the control sequence preset therein and shown in FIG. 23, reconfigures the arc electrodes and the model which is an analysis object in calculating the temperature distribution of the silica powder molded body. For this purpose, the condition changer 5 outputs the position of the arc electrodes, the value of the discharge current, and the heating time to the mesh divider 1, the heat convection calculator 2, the radiation heat amount calculator 3 and the temperature distribution calculator 4. A notice showing that conditions are changed is also outputted.

Then, the mesh divider 1 forms meshes for a new analytical space. A region to change the shape of the meshes is predetermined as a mesh changing region. The region is in a range in which the arc electrodes, i.e. the region to release the gas flow or the source of the radiation heat amount are moved in accordance with the control sequence. Meshes corresponding to the position, inputted from the condition changer 5, of the arc electrodes are formed only in this region.

The heat convection calculator 2, when the position of the arc electrodes is inputted, newly calculates the velocity vector, calculates the temperature distribution of the new layer meshes, and calculates the heat flux q from the meshes of the heat flow to the meshes on the inner surface of the silica powder molded body, in the silica powder molded body and the inner space thereof. The initial conditions are the temperature distribution finally obtained based on the just-previous sequence conditions. The boundary conditions are obtained by reading, from the correspondence table of the model memory 6, the gas flow conditions corresponding to the arc electrodes and the discharge current and voltage for the next process in the control sequence.

In the calculation by the radiation heat amount calculator 3, the pair of the radiation surface and the irradiated surface in the formula (3) is reset, and the area ds and dS are also recalculated. Then, the radiation heat amount calculator 3 reads, from the model memory 6, the radiation conditions stored in connection with the position of the arc electrodes and the discharge current for the next process in the control sequence.

The radiation heat amount calculator 3 calculates the heat flux P from the heat radiation from the heat source to the inner surface of the silica powder molded body, for the pair of the meshes of the radiation surface and irradiated surface. In this calculation, the temperature distribution finally obtained in the just previous sequence condition is used for the initial conditions. The radiation conditions read from the model memory 6 are used for the boundary conditions.

The temperature distribution calculator 4 calculates the temperature of the first layer of the meshes from the heat flux which is the sum of the heat flux P and heat flux q in the silica powder molded body and the mold. In this calculation, the temperature distribution finally obtained in the just previous control sequence condition is used for the initial conditions. Then, the temperature distribution calculator 4 uses the obtained temperature of the first layer of the meshes as the boundary conditions to calculate the temperature distribution in the thickness direction in the silica powder molded body and the mold.

The subsequent processes are similar or identical to those already described. Thus, the heat flux, to the inner surface of the silica powder molded body, due to the heat convection and heat radiation is calculated while changing the position of the arc electrodes when each of the predetermined time points has passed in accordance with the control sequence.

As mentioned above, in the present embodiment, the position of the arc electrodes is matched with that in the control sequence for manufacturing a crucible, and the gas flow conditions and radiation conditions are also matched with those in the control sequence.

Then, the arc electrodes are moved every time a predetermined time period (heating time) has passed in the control sequence. Then, the change of the temperature distribution in the silica powder molded body is calculated by calculating the heat flux as mentioned above during the heating time unit in each of the steps.

The time-course change of the temperature distribution enables easy calculation of the melting rate which is a rate of temperature change for melting by detecting how the position reaching the melting temperature move in the silica powder molded body. Then, the shape (e.g. the thicknesses of the bottom portion, corner portion and sidewall) of the manufactured crucible can be estimated.

By use of this result, unlike a conventional method, an appropriate control sequence can be designed without actually manufacturing the crucible while changing the position of the arc electrodes and various conditions.

11. Taking Account of Mold Rotation

A crucible is manufactured by fusing the silica powder molded body while rotating the mold.

Therefore, in calculating the temperature distribution, this mold rotation needs to be taken into account. The speed of rotation is relatively slow (e.g. 20 RPM (revolution per minute), and the influence of the viscosity on the convection is small. So, in order to take account of the mold rotation, the temperature distribution data for the meshes positioned on the same circumference are averaged repeatedly with an interval determined in connection with the speed of rotation. For this averaging, all meshes (including those in the thickness direction) of the measurement object are taken into account. Then, the averaged temperature distribution is used for the initial values to calculate the temperature distribution.

Here, when the speed of rotation is 20 RPM, one rotation takes 50 msec. So, the averaging of the temperature distribution data of the meshes on the same circumference mentioned above may be performed in a cycle which is sufficiently shorter than 50 msec, for example, 5 msec.

By doing this, except for the heat convection, the fluid analysis for the viscosity of the air on the inner surface of the silica powder molded body becomes unnecessary. Therefore, the time for the calculation of the temperature distribution in the silica powder molded body can be reduced, and thus the change of the temperature distribution on the inner surface of the silica powder molded body in manufacturing the crucible can be obtained easily.

Furthermore, the data for the meshes on the same circumference are identical. Therefore, in view of the symmetry of the silica powder molded body, it is possible to store the temperature distribution of the whole silica powder molded body by just storing the data, along the thickness direction of the silica powder molded body, on the cross-section passing through the center of the opening of the silica powder molded body and vertical to the plane of the opening. This enables large reduction of memory capacity for storing the temperature distribution of the silica powder molded body. Therefore, the number of accesses to the memory during the calculation can be reduced, and thus the processing speed for the calculation of the temperature distribution can be accelerated.

In the present embodiment, the finite element method is used for the thermal fluid analysis. However, other numerical calculation (numerical analysis) methods such as the finite volume method, and the finite differential method may be used as long as the method divides the calculation object into meshes, perform numerical calculation mesh-by-mesh, and perform numerical calculation for the calculation object as a whole based on the results of the mesh-by-mesh numerical calculation.

The model memory 6 and the physical property memory 7 are configured by a nonvolatile memory such as a hard disk apparatus, a magneto-optical disk apparatus, and a flash memory, a read-only storage medium such as CD-ROM, a volatile memory such as RAM (Random Access Memory), or the combination of these.

The mesh divider 1, the heat convection calculator 2, the radiation heat amount calculator 3, the temperature distribution calculator 4 and the condition changer 5 shown in FIG. 3 can be realized by a dedicated hardware, or can be realized by a memory and a microprocessor.

This mesh divider 1, the heat convection calculator 2, the radiation heat amount calculator 3, the temperature distribution calculator 4 and the condition changer 5 can be realized by a dedicated hardware, and the processing unit 30 may be configured by a memory and a CPU (Central Processing Unit), and the function may be realized by loading a program to realize the function to the memory, and running the program.

Furthermore, peripherals such as an input apparatus, and a display apparatus (each not shown) are connected to this apparatus for calculating a temperature distribution. Here, the input apparatus refer to an input device such as a keyboard, and a mouse, and the display apparatus refers to a CRT (Cathode Ray Tube), a liquid crystal display apparatus etc.

Furthermore, a program to realize the functions of the mesh divider 1, the heat convection calculator 2, the radiation heat amount calculator 3, the temperature distribution calculator 4 and the condition changer 5 in FIG. 1 may be stored in a computer readable storage medium. The program may be loaded to a computer system to perform the calculation of the temperature distribution. Here, the "computer system" includes the OS and the hardware such as peripherals.

Furthermore, the "computer system" includes an environment to provide (or display) a website when it utilizes the WWW system. Furthermore, the "computer readable storage medium" refers to a portable medium such as a flexible disk, a magneto-optical disk, a ROM, a CD-ROM, and a built-in storage device such as a hard disk.

Furthermore, the "computer readable storage medium" also includes a medium dynamically storing the program for a short period such as a communication line transmitting the program via a network such as the Internet and a communication channel such as a telephone channel, a medium holding the program for a certain period such as a volatile memory in the computer system which is a server or a client in that case Furthermore, the above program may be for realizing a part of the above-mentioned functions, and it may realize the above functions in conjunction with a program already stored in the computer system.

Embodiments of the invention have been described with reference to drawings. The specific configuration is not limited to the embodiments, but the present invention includes embodiments designed so as not to get out of the spirit of the invention.

EXPLANATION OF REFERENCE SYMBOL

1 mesh divider
2 heat convection calculator
3 radiation heat amount calculator
4 temperature distribution calculator
5 condition changer
6 model memory
7 physical property memory

The invention claimed is:

1. A method of calculating a temperature distribution of a crucible during manufacturing, comprising a temperature calculation process for calculating a temperature distribution of a silica powder molded body using a numerical calculation method in which a calculation object is divided into meshes, and mesh-by-mesh numerical calculation is performed, and numerical calculation of the calculation object as a whole is performed based on the result of the mesh-by-mesh numerical calculation, wherein the silica powder molded body is formed, in a certain thickness, on an inner surface of a mold for manufacturing a crucible;
heat plasma generated by supplying discharge current to arc electrodes is released to the silica powder molded body;
the position of the arc electrodes and the discharge current are changed according to a control sequence;
the temperature distribution is calculated for each of steps of the control sequence for manufacturing the crucible by melting and solidifying the silica powder molded body;
the heat plasma is modeled by heat convection due to a gas flow, and radiation;
an initial velocity, heat amount, and temperature of the gas flow, and a temperature and heat amount of the radiation are used as boundary conditions for the numerical calculation method;
a temperature calculator calculates the temperature distribution by reading the boundary conditions corresponding to the position of the arc electrodes and the discharge current for each of the steps, from a correspondence table describing the boundary conditions of the gas flow and the radiation corresponding to the discharge current for each of the positions of the arc electrodes;
the correspondence table is prepared in advance by, for each combination of the position of the arc electrodes and the discharge current, comparing an actually measured temperature distribution of the silica powder molded body irradiated with plasma and a calculated temperature distribution obtained from the numerical calculation method using the boundary conditions of the gas flow and the radiation, and adjusting the boundary conditions so that the actually measured and calculated temperature distributions coincide.

2. The method of claim 1, wherein the actually measured temperature distribution is a temperature on a silica powder molded body inner surface.

3. The method of claim 1, wherein the temperature calculation process comprises:
   a mesh division process in which a mesh divider divides, into a plurality of finite elements, the silica powder molded body, the silica powder molded body inner space, the mold and the mold outer space;
   a heat convection condition reading process in which a heat convection calculator reads, from the correspondence table according to the position of the arc electrodes and the discharge current, gas flow conditions comprising a temperature, flow rate, and heat amount of the gas flow released from a source which is a model of a heat plasma flow released from the arc electrodes, and reads physical properties of a medium of heat convection in the silica powder molded body inner space, from a memory storing physical properties of a medium in connection with the medium;
   a heat convection calculation process in which the heat convection calculator calculates heat flux supplied from the heat convection to the surface of the silica powder molded body, using, as boundary conditions, the gas flow conditions, the physical properties of the medium, and the temperature of the silica powder molded body inner surface;
   a radiation condition reading process in which a radiation heat amount calculator reads, from the correspondence table according to the position of the arc electrodes and the discharge current, radiation conditions comprising a temperature and heat amount radiated from a heat source which is a model of radiation from the arc electrodes to the silica powder molded body;
   a radiation heat amount calculation process in which the radiation heat amount calculator calculates heat flux supplied to the surface of the silica powder molded body, using, as boundary conditions, the radiation conditions and the temperature of the silica powder molded body inner surface;
   a temperature distribution calculation process in which a temperature distribution calculator calculates the temperature distribution of the silica powder molded body by performing heat transfer analysis between the silica powder molded body inner space and the silica powder molded body and heat conduction analysis within the silica powder molded body, using the heat flux from the heat convection and the radiation as boundary conditions.

4. The method of claim 3, further comprising, in the temperature distribution calculation process, reading, from a memory storing physical properties of silica powder in connection with temperature of silica powder which is a material of the silica powder molded body, the physical properties in connection with the temperature of the silica powder molded body, and calculating the heat flux from the heat convection to the silica powder molded body inner surface, for taking account of a state change from powder to melting of the silica powder molded body.

5. The method of claim 3, further comprising, in the temperature distribution calculation process, changing, on a mesh basis, physical properties of the silica powder molded body in connection with the temperature distribution, and calculating the temperature distribution from a powder state to a melting state of the silica using the original meshes.

6. The method of claim 3, wherein the gas flow conditions and the radiation conditions, used as boundary conditions, in the correspondence table are corrected based on the result of comparison between a temperature distribution actually measured on the crucible inner surface in a manufacturing process, and a temperature calculated on the silica powder molded body surface in the temperature distribution calculation process, provided that the position of the arc electrodes and the discharge current are identical.

7. The method of claim 1, wherein a heat amount due to the convection of the gas flow is larger than a heat amount due to the radiation from the arc electrodes.

8. An apparatus of calculating a temperature distribution of a crucible during manufacturing, comprising a temperature calculator for calculating a temperature distribution of a silica powder molded body using a numerical calculation method in which a calculation object is divided into meshes, and mesh-by-mesh numerical calculation is performed, and numerical calculation of the calculation object as a whole is performed based on the result of the mesh-by-mesh numerical calculation, wherein
   the silica powder molded body is formed, in a certain thickness, on an inner surface of a mold for manufacturing a crucible;
   heat plasma generated by supplying discharge current to arc electrodes is released to the silica powder molded body;
   the position of the arc electrodes and the discharge current are changed according to a control sequence;
   the temperature distribution is calculated for each of steps of the control sequence for manufacturing the crucible by melting and solidifying the silica powder molded body;
   the heat plasma is modeled by heat convection due to a gas flow, and radiation;
   an initial velocity, heat amount, and temperature of the gas flow, and a temperature and heat amount of the radiation are used as boundary conditions for the numerical calculation method;
   the temperature calculator calculates the temperature distribution by reading the boundary conditions corresponding to the position of the arc electrodes and the discharge current for each of the steps, from a correspondence table describing the boundary conditions of the gas flow and the radiation corresponding to the discharge current for each of the positions of the arc electrodes;
   the correspondence table is prepared in advance by, for each combination of the position of the arc electrodes and the discharge current, comparing an actually measured temperature distribution of the silica powder molded body irradiated with plasma and a calculated temperature distribution obtained from the numerical calculation method using the boundary conditions of the gas flow and the radiation, and adjusting the boundary conditions so that the actually measured and calculated temperature distributions coincide.

9. The apparatus of claim 8, wherein the temperature calculator comprises a mesh divider, a heat convection calculator, a radiation heat amount calculator, a temperature distribution calculator,
   the mesh divider performs a mesh division process in which a mesh divider divides, into a plurality of finite elements, the silica powder molded body, the silica powder molded body inner space, the mold and the mold outer space;

the heat convection calculator performs a heat convection condition reading process in which a heat convection calculator reads, from the correspondence table according to the position of the arc electrodes and the discharge current, gas flow conditions comprising a temperature, flow rate, and heat amount of the gas flow released from a source which is a model of a heat plasma flow released from the arc electrodes, and reads physical properties of a medium of heat convection in the silica powder molded body inner space, from a memory storing physical properties of a medium in connection with the medium;

the heat convection calculator performs a heat convection calculation process in which the heat convection calculator calculates heat flux supplied from the heat convection to the surface of the silica powder molded body, using, as boundary conditions, the gas flow conditions, the physical properties of the medium, and the temperature of the silica powder molded body inner surface;

the radiation heat amount calculator performs a radiation condition reading process in which a radiation heat amount calculator reads, from the correspondence table according to the position of the arc electrodes and the discharge current, radiation conditions comprising a temperature and heat amount radiated from a heat source which is a model of radiation from the arc electrodes to the silica powder molded body;

the radiation heat amount calculator performs a radiation heat amount calculation process in which the radiation heat amount calculator calculates heat flux supplied to the surface of the silica powder molded body, using, as boundary conditions, the radiation conditions and the temperature of the silica powder molded body inner surface;

the temperature distribution calculator performs a temperature distribution calculation process in which a temperature distribution calculator calculates the temperature distribution of the silica powder molded body by performing heat transfer analysis between the silica powder molded body inner space and the silica powder molded body and heat conduction analysis within the silica powder molded body, using the heat flux from the heat convection and the radiation as boundary conditions.

\* \* \* \* \*